April 12, 1949.    J. R. DESCH ET AL    2,467,257
ELECTRONIC REMOTE CONTROL DEVICE Filed May 11, 1944    6 Sheets-Sheet 3

Inventors
JOSEPH R. DESCH &
ERNEST V. GULDEN

By Carl Beust
Their Attorney

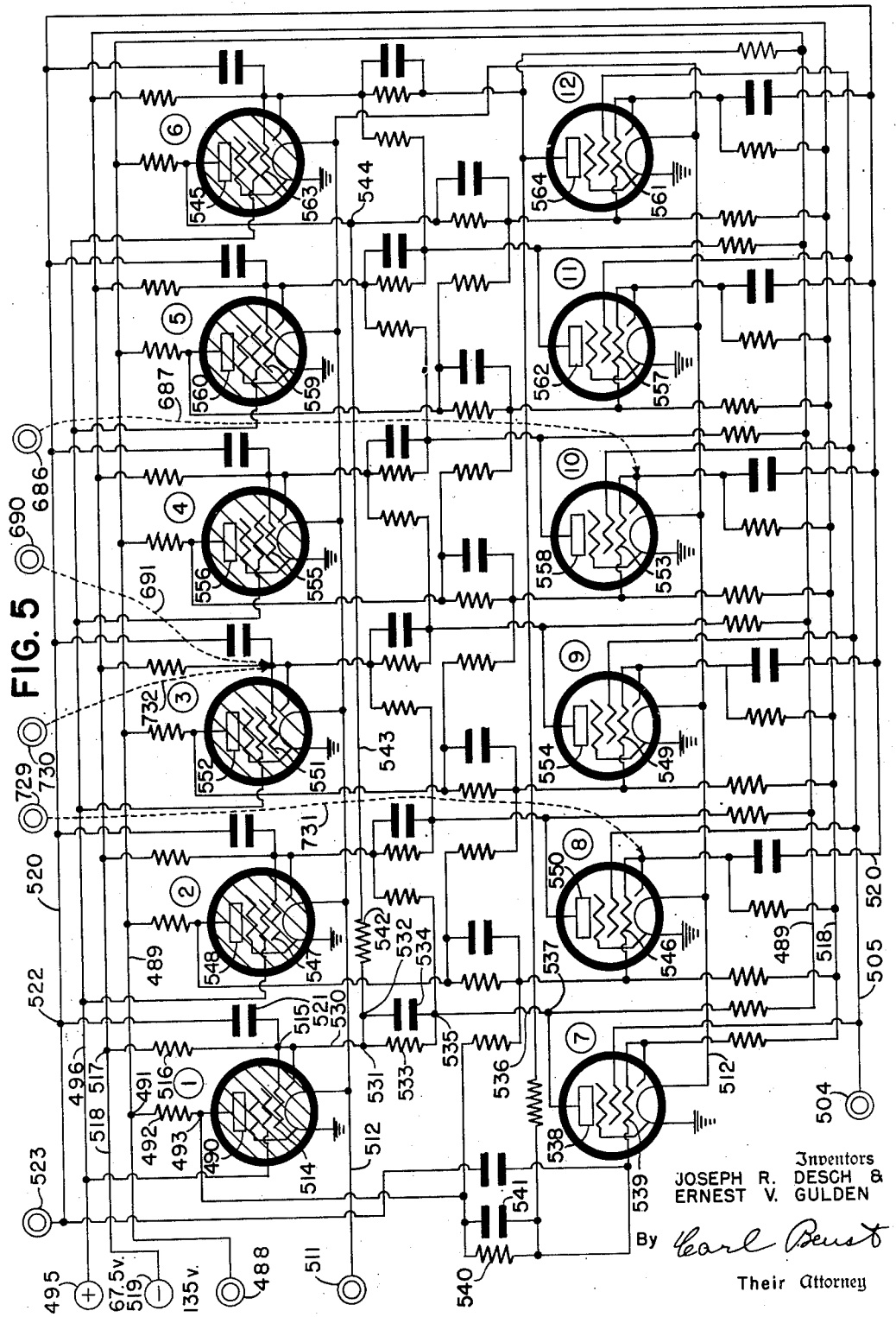

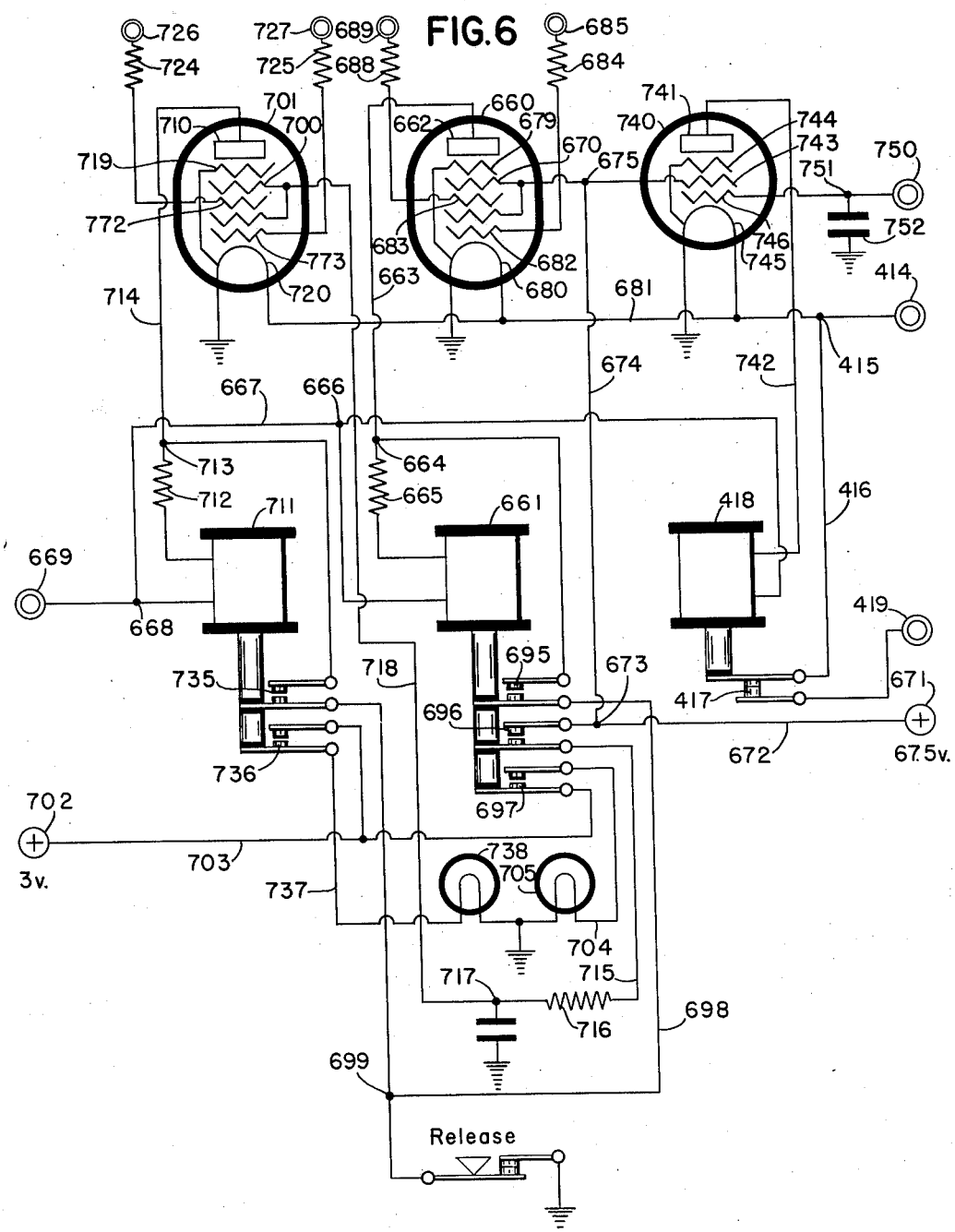

Patented Apr. 12, 1949

2,467,257

UNITED STATES PATENT OFFICE 2,467,257

ELECTRONIC REMOTE-CONTROL DEVICE

Joseph R. Desch and Ernest V. Gulden, Dayton, Ohio, assignors to The National Cash Register Company, Dayton, Ohio, a corporation of Maryland Application May 11, 1944, Serial No. 535,040

32 Claims. (Cl. 250—2)

This invention relates to electronic control apparatus which can operate rapidly and accurately to control the operation of other mechanisms and is selective in its operation.

The novel control apparatus is particularly well suited for use where remote control is desired, and consists of a sending or signal generating apparatus and a receiving apparatus.

The sending apparatus can be controlled according to control symbols to generate and send out different numbers of signals corresponding to the control symbols, which signals can cause the operation of the receiving apparatus.

The receiving apparatus contains differentially operable means which can respond to the different numbers of signals which are sent from the sending apparatus, and contains further means which can be controlled by the differentially operable means and can provide the desired control over the operation of some other mechanism. This further means can be preset to operate and provide an indication or exert some control over the operation of some other mechanism whenever a predetermined number of signals representing a particular control symbol is received, and is so arranged that it can readily be changed from one setting to another to render it operable to respond to the number of signals which represent some other control symbol.

Various systems of symbols may be used in setting up the selective control of the generation of signals and in presetting the control means of the receiving apparatus, and these symbols may take any form such as the letters of the alphabet, the digits of a numerical notation, the combination of letters and digits, or any other arbitrarily chosen symbols. In whatever system of symbols that is chosen to set up the particular controls, each symbol will be assigned a number of signals by which it will be represented, and this number of signals will be generated as a burst of signals whenever the symbol occurs during the operation of the signal generating apparatus. For instance, if the digits of a decimal notation are used, "1" is represented by a burst containing one signal; "2" is represented by a burst containing two signals; "3" is represented by a burst containing three signals; and in a similar manner the other digits are represented by bursts of signals containing the corresponding numbers of digits.

The signals by which the symbols may be represented and which cause the differential operation of the receiving apparatus may take any desired form; for instance, they may be potential impulses and/or interruption or modulation of a carrier wave. These signals may be transmitted from the sending or impulse generating apparatus to the receiving apparatus in any desired manner, as over a wire or by radio.

The bursts of signals occur so rapidly that, even though radio is the transmission medium, it will be extremely difficult for an unauthorized person to determine the characteristics of the signals sufficiently to enable him to tamper with the control apparatus by producing a sending apparatus which can send signals to cause the improper and unwanted operation of the control apparatus.

While not limited in its application to a remote control system, the novel apparatus is well adapted to be incorporated in a remote control system and particularly in a system using mobile or portable receiving apparatus located apart from the sending apparatus and controlled by signals transmitted thereto by radio.

In order that the invention may be explained more fully, it will be shown embodied in a battery-operated, portable, radio-controlled receiving apparatus which may be preset according to any two control numbers, each of which may be selected from the numbers 1 through 10, to provide an indication whenever the preset control numbers have been received, and can be operated from a sending or signal generating apparatus which can modulate a radio-frequency carrier wave to provide the desired signals in the form of bursts of impulses which are transmitted one after another with a suitable space or time interval between bursts. However, it is not intended to limit the invention to the form of apparatus shown in this particular embodiment, nor is it intended that the control be limited to two control numbers, because the invention is capable of being carried out by the use of other equivalent arrangements and by the use of more or fewer control numbers.

In order that the receiving apparatus will be small and portable, it is constructed with but one differentially operable electronic means, and this means is used twice to provide an indication of the numbers represented by each of the two bursts of signals. Suitable means are provided to clear the differentially operable means of its setting, this means being automatically set in operation by the first signal of a burst and operable during the interval between the bursts of signals to clear the differentially operable means of any setting resulting from a previous burst and to prepare the differentially operable means for actuation by a further burst of signals.

When the novel control means is embodied in a portable, battery-operated receiver, as in the disclosed embodiment, the receiver is normally controlled to be in a standby condition, in which it uses very little power, and this condition can be changed to an operative condition by a special control signal sent from the sending apparatus under control of a special control means prior to the sending of the bursts of signals representing the two control numbers by which the control data may be sent. Timing means, set in operation when the receiving apparatus is set in operative condition, are effective to restore the receiving apparatus to standby condition and to clear the various parts thereof after a predetermined time which is sufficient to allow the receiver to respond to the two control numbers sent thereto in a normal manner.

The requirement that the receiving apparatus be rendered operative by a special control signal not only saves power, but also guards against the improper operation of the control apparatus, when radio is the transmission medium, by preventing static or other electrical disturbances from causing an undesirable operation of the receiving apparatus.

It is an object of the invention, therefore, to produce a control apparatus which can be operated quickly and accurately and which is very flexible in its operation and control.

A further object of the invention is to provide control apparatus which includes a signal-generating apparatus for generating different numbers of discrete rapidly recurring signals and a receiving apparatus which can be mobile or portable and can be controlled by radio and which can be preset to exert a particular control or give an indication each time it receives certain predetermined numbers of signals from the signal-generating apparatus.

A further object of the invention is to provide means which enable the presetting of the receiving apparatus to be done in a simple manner so that the presetting of the apparatus can readily be changed to enable the apparatus to respond to any one or another predetermined number of signals and provide a particular control or give an indication whenever the proper number of signals has been received.

A further object of the invention is to provide novel controls for a receiving apparatus to change the apparatus from a standby condition to an operative condition upon the receipt of a special control signal.

A further object of the invention is to provide novel controls for a radio-operated receiving apparatus to prevent static or other electrical disturbances from causing an improper operation of the receiving apparatus.

A further object of the invention is to provide novel controls for a differentially operable electronic means to cause the means to be cleared and reset to its starting condition automatically at a predetermined time after it has completed its differential operation.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 5 shows the differentially operable electronic means which is differentially operated according to the number of signal impulses in each burst and is operable to control a presettable means.

Figure 1:
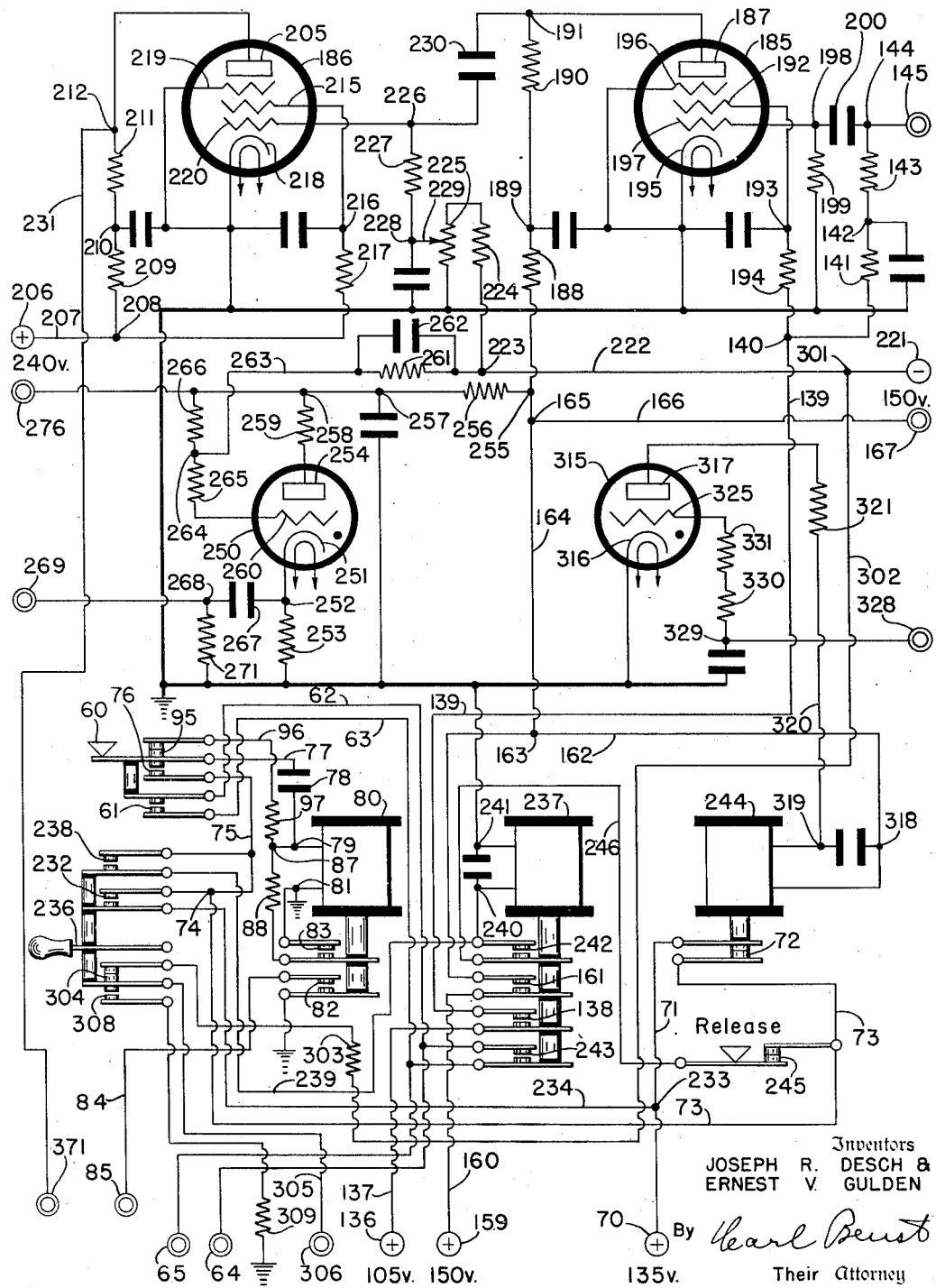
Fig. 1 shows a portion of the sending or impulse generating apparatus, including means for generating the special control signal and controlling a transmitter accordingly; means for amplifying and shaping the impulses of the bursts and controlling the transmitter; and means for controlling the initiation and termination of the sending of the bursts of signal impulses.

Fig. 6 shows means for restoring the receiving apparatus to standby condition at the expiration of a predetermined time after the apparatus was put in operative condition and also shows the presettable means which is controlled by the differentially operable means and which can be preset according to any desired control numbers to operate an indicator when the required control numbers have caused the operation of the differentially operable means.

GENERAL DESCRIPTION

As explained earlier herein, the invention will be shown embodied in a sending or impulse-generating apparatus which may send the desired signals and control numbers by radio and in a battery-operated, portable, radio-controlled receiving apparatus which may be preset according to two control numbers, each between the values 1 and 10, to provide an indication whenever the preset control numbers have been received and which can be operated by radio from the sending or signal-generating apparatus, which modulates a radio-frequency carrier wave to provide the required signals in the form of impulses. It will be clear from the description, as it proceeds, that the invention is not limited to the form of apparatus shown but can be embodied in other forms as may be required by the conditions under which the novel control apparatus is to be used.

The novel control apparatus is capable of many uses. For instance, the means in the receiving apparatus may be preset to cause a machine to begin operating when the apparatus responds to particular control numbers, and other means may be provided in the receiving apparatus and be preset to cause the operation of the machine to stop when the apparatus responds to other control numbers. Also a plurality of similar units of receiving apparatus containing the presettable means may be provided for individually controlling the operation of a plurality of machines, and the plurality of units may be preset according to different control numbers and be operated selectively from a central signal generating and sending station which can be controlled to generate signals according to any desired control numbers.

Instead of controlling the operation of a machine, the novel apparatus may be used to cause a signal light to be lighted, a bell to be rung, or some other signal to be given each time it responds to the number of signals corresponding to the control numbers to which it has been preset.

The presetting of the means in the receiving apparatus to respond to any particular control numbers can be accomplished very easily, so that the control numbers can be changed very readily if desired, and this renders the apparatus very flexible in controlling its response to different numbers of signals which may be transmitted to it. For instance, if a plurality of units were preset to respond to certain control numbers and it was decided that some of these units should not respond along with the others, then these units could readily be preset to respond to other control numbers, and the separate control of the different units under different control conditions could readily be obtained.

The sending apparatus includes a radio-frequency transmitter whose final amplifier is biased to cut-off for grid modulation, and also includes means to modify the control of the final amplifier to cause a special control signal and two bursts of control-number-representing impulses to be sent therefrom. The sending apparatus can be controlled to regulate the number of impulses in each burst and can be controlled further either to send the bursts one after another automatically in succession in response to a single initiating control or to send the bursts with a separate initiation control required for the sending of each burst.

The transmitter is a conventional type of radio-frequency transmitter. The final stage of amplification of the transmitter is biased to cut-off, so that normally the radio-frequency carrier wave will not be transmitted; however, modulating means and other control means are provided and can be controlled to reduce the bias on the final stage of the transmitter to cause the carrier wave to be transmitted to form the special control signal and the bursts of control-number-representing impulses. As will be explained hereinafter, the special control signal and the impulses of the bursts are of quite short duration, and, since the final stage amplifier is normally biased to cut-off, the radio-frequency carrier wave is transmitted only during the very short time actually required for producing each of the signals or impulses. Accordingly, even though radio is the communication medium, the nature of the signals is such that it will be almost impossible for an unauthorized person to determine the frequency of the carrier wave or the characteristics of the signal sufficiently to enable him to construct a sending apparatus which would enable him to tamper with the controls by sending undesired signals to the receiving apparatus.

The means to control the final amplifier to produce the special control signal includes a manipulative device which can be operated to apply potential to a circuit which includes a capacitor and relay in series. The current flowing in this circuit, while the capacitor is charging, will cause the relay to be energized and operate to close a circuit which reduces the bias on the final amplifier of the radio-frequency transmitter and allows a square-top signal of the desired duration to be transmitted. As soon as the capacitor becomes charged and current no longer flows through the relay, the relay will be deenergized and will open the circuit to the transmitter, which allows the bias to be restored on the final amplifier.

It will be recalled that the receiving apparatus is normally in a standby condition, in which it cannot be operated by static or other electrical disturbances, and that the apparatus can be changed to an operative condition by the special control signal. This protective feature can be preserved by requiring that a control signal which lasts about a half second be used to change the receiving apparatus from a standby condition to an operative condition. The desired duration of the control signal can be obtained by controlling the capacity of the capacitor or changing other factors which govern the length of time for charging the capacitor in the circuit of the relay.

The means for controlling the modulating means to control the final amplifier of the transmitter to cause the bursts of impulses which represent control numbers to be transmitted includes two banks of keys upon which the control numbers may be set, two banks of gaseous electron tubes controlled thereby to produce the required number of impulses in each burst, and impulse shaping means which are controlled by the banks of gaseous electron tubes and give the impulses a spire-like shape, which is desired. The impulse shaping means control the modulating means for the transmitter to cause the bias on the final amplifier to be modified so that the radio-frequency carrier can be modulated to produce the bursts of signal impulses which represent the control numbers.

Each bank of keys contains a key for each of the numbers 1 through 10, and these keys are used to set up the control numbers which are to be transmitted. Associated with each bank of keys is a bank of gaseous electron tubes which contains a tube corresponding to each of the numbers represented by the keys.

The tubes of each bank are connected in a chain to be fired automatically one after another in sequence from the "10" tubes through the "1" tube, and, as each tube is fired, it will cause any previously conducting tube to be extinguished. The automatic firing of the tubes can begin with any tube in the bank and, when once begun, will continue to the end of the chain. The depressed key in any bank closes a circuit to select its related tube as the starting point in the firing sequence by preparing the tube to be fired in response to a starting or firing impulses commonly impressed on all the tubes of the bank, and, as soon as the selected tube is fired, it will start the automatic firing of the tubes. Each tube, when fired, will cause an impulse to be generated so that the automatic firing of the tubes of the bank will produce a burst of impulses containing the number of impulses corresponding to the control number set up on the keys. The automatic firing of the tubes in the bank takes place rapidly and enables the impulses of the burst to be generated at a frequency of at least 20,000 impulses per second, which enables the transmission of the control numbers to take place very rapidly.

In the instant embodiment, the control number and the number of impulses which represent it are the same, but this relation is not necessary, as any number of impulses may arbitrarily be assigned to represent any control number or symbol as desired.

When the control numbers have been set up on the banks of keys and the special control signal has been sent, the sending of the bursts of signals can be initiated by means set in operation by a manipulative member. Since the receiving apparatus is changed from a standby condition to an operative condition by the special control signal, it is necessary to wait two or three seconds after the special control signal has been sent before initiating the sending of the bursts of signals in order to insure that the cathodes of the tubes of the receiving apparatus will be properly heated and the receiving apparatus is in condition to operate in response to the received impulses. The manipulative member, when operated, operates means to cause a firing impulse to be impressed on the bank of tubes which generates the first burst of impulses, to initiate the automatic firing of the tubes beginning with the tube selected by the key which has been depressed. The tubes of the bank which follow the selected tube in the chain are fired one after another and generate the number of impulses required to represent the first control number.

The sending apparatus may have either of two modes of operation after the "1" tube, or the last tube in the chain, is fired. The firing of the "1" tube may cause the initiation of the generation of the second burst automatically, or the initiation may require a further operation of the manipulative member.

If the second burst of impulses is to be generated automatically after the first burst, then the "1" tube in the first bank is connected to a "Shift" tube and causes this tube to be fired automatically after a suitable delay. The "Shift" tube shifts the impulse generating action from the first bank to the second bank by impressing a firing impulse on the tubes of the second bank to fire the selected tube therein and initiate the automatic firing of the tubes in this bank.

On the other hand, if the initiation of the generation of the second burst requires a further operation of the manipulative member, then the "Shift" tube is disconnected from the "1" tube and is connected to be fired by the further operation of the manipulative member.

The tubes of the second bank will be fired automatically in succession beginning with the tube which has been selected by the depressed key in the bank of keys related to this bank of tubes and will generate the number of impulses required to represent the second control number. When the "1" tube of this bank is fired, it causes means to operate to terminate the operation of the sending apparatus.

The impulses which are generated by the banks of tubes are used to control a pair of impulse amplifying and sharpening tubes which produce a spire-like impulse for each generated impulse. The output from these tubes is used to control the modulating means for the radio-frequency transmitter which modifies the bias on the final amplifier to reduce the bias and cause the radio-frequency carrier wave to be modulated to produce the spaced bursts of impulses which are transmitted to the receiving apparatus.

The operation of the sending or impulse generating apparatus in sending the control numbers "9" and "2" is as follows.

The means which controls the final amplifier of the radio-frequency transmitter to cause the square top special control signal to be sent is operated to cause a special control signal of about a half second's duration to be transmitted. After an interval of about three seconds, which insures that the receiving apparatus is in operative condition, the sending of the burst of impulses representing the control number "9" can begin.

Prior to the beginning of the sending of the bursts of impulses representing the control numbers, the "9" key in the bank which controls the generation of the first burst of impulses is depressed to select the "9" tube in its related bank as the tube with which the automatic firing of the tubes of the bank will begin, and the "2" key in the other bank is depressed to select the "2" tube in its related bank as the tube with which the automatic firing of the tubes of the bank will begin.

The sending of the first burst is initiated by the operation of a manipulative member which operates means to send a firing impulse to the bank of tubes which generates the first burst of impulses. As the "9" tube in this bank has been selected as the starting point, it will be fired by the impulse. Following the "9" tube, the "8," "7," "6," "5," "4," "3," "2," and "1" tubes will be fired one after another in sequence in that order, and, as the firing of each tube generates an impulse, a burst of nine impulses will be generated.

After a suitable interval, a firing impulse will be sent, either automatically or under manual control, to the second bank of tubes. As the "2" tube has been selected as the starting point in this bank, the "2" tube will be fired by the firing impulse and will automatically fire the "1" tube to cause two impulses to be generated in the second burst. The "1" tube in this bank will fire a stop tube, which terminates the operation of the sending apparatus and restores it to its normal condition.

The impulses which are generated by the banks of tubes are shaped and amplified and are effective to control the modulating means for the transmitter to modify the bias on the final amplifier thereof to cause the radio-frequency carrier wave to be modulated to provide the two bursts of signal impulses which are transmitted to the receiving apparatus, the first burst containing nine signal impulses and the second burst containing two signal impulses.

The receiving apparatus, which is normally in a standby condition, is placed in standby condition by the closure of a suitable switch and includes a radio-frequency responsive means which can detect the transmitted signals and cause the receiving apparatus to be put in operative condition and can also make the signals available for controlling the operation of the various other means of the apparatus which enable a suitable indication to be given whenever signals corresponding to preset control numbers have been received.

The radio-frequency portion of the apparatus contains two tubes. One of these tubes may be considered as the first stage and is the only tube in the receiving apparatus which is operative when the receiving apparatus is in standby condition. This tube is normally biased to operate as a detector and is effective, when the special control signal is received, to cause relay means to operate and change the apparatus from its normal standby condition to an operative condition.

When the relay means operates in response to the special control signal, it applies cathode heating potential and operating potentials to the other tube of the radio-frequency portion, which is coupled to the first stage and may be considered as the second stage, and provides a bias to cause the second stage to operate as a detector.

The operated relay means modifies the bias on the first stage to change the operation of this stage from that of detection to that of ordinary class A, tuned radio-frequency amplification, so that, when the receiving apparatus is in operative condition, the first stage operates as an amplifier and the second stage operates as a detector.

The relay means is effective further, when it operates, to supply cathode heating potential and operating potentials to other tubes of the receiving apparatus to render them operative.

Timing means are also set in operation by the relay means to cause the receiving apparatus to be restored to standby condition automatically after a predetermined interval of time. The timing means includes a tube which is normally biased to cut-off by a negative potential applied to its control grid through a resistance-capacitance network. When the relay means operates, it applies positive potential to this network, tending to overcome the negative bias on the control grid and rendering the tube conductive; however, due to the capacitance in the network, the applied positive potential will not be effective to overcome the negative bias on the control grid of the tube, and the tube can not become conducting until the end of the predetermined period of time. The length of time between the application of the potential and the operation of the tube can be controlled by regulating the amount of capacitance or resistance in the network.

A holding circuit is closed by the relay means to maintain the relay means energized and the receiving apparatus in operative condition until the timing means operates to restore the receiving apparatus to standby condition. A restoring relay, which is energized when the tube in the timing means is conducting, operates contacts to open the holding circuit and release the relay means to allow the receiving apparatus to return to standby condition when the timing means operates.

After the receiving apparatus has been placed in operative condition, the bursts of impulses representing control numbers may be received. In order that the impulses which are to operate the differentially operable electronic means will be uniform and will not show the effect of any variation in signal strength during transmission, the output of the second stage of the radio-frequency portion is used to control an impulse amplifying and shaping means which insures that the signals supplied to the differentially operable means have the desired shape and will be of the necessary strength to cause its proper operation.

The output of the impulse amplifying and shaping means consists of negative potential impulses which are impressed on the differentially operable means to cause its operation according to the control numbers and which are impressed on control means for causing the resetting or clearing of the differentially operable means after its differential operation in response to the impulses of a burst.

The differentially operable electronic means, which is used to set up a representation of the control number which corresponds to the number of impulses in a burst, is an electronic counting ring, and, because the receiving apparatus in the disclosed embodiment is portable and battery-operated, this ring consists of a plurality of battery-operated vacuum tubes. In order to provide the required capacity for the differentially operable means, twelve vacuum tubes are provided, and these tubes, numbered from 1 through 12, are connected to form six trigger pairs, each pair of which must have one mode of operation or another; that is, either one or the other tube of the pair must be conducting at any given instant while the remaining tube in each pair must be non-conducting. Accordingly, at any given instant, half of these tubes will be conducting and half will be non-conducting. The pairing of the tubes is effected by trigger connections between the "1" and "7" tubes; the "2" and "8" tubes; the "3" and "9" tubes; the "4" and "10" tubes; the "5" and "11" tubes; and the "6" and "12" tubes.

In addition to their being connected to form trigger pairs, the tubes of the ring are also connected in an endless operative network of priming connections, which prepare the pairs to enable the trigger pairs to change their mode of operation one after another in succession in response to negative potential impulses which are impressed on all the tubes of the ring by the impulse amplifying and shaping means.

The trigger connections and the priming network connections between the tubes of the ring are so related that at any stage of the operation of the ring the six tubes which are conducting will have consecutive numbers, and, as input impulses cause the operation of the ring, the tubes that are conducting will have values which are advanced one step as each impulse is received.

The following tabulation shows the conducting and non-conducting condition of the tubes at different stages of operation of the ring after different numbers of impulses have been impressed thereon.

| Number of Impulses | Tubes Conducting | Tubes Non-Conducting |
|---|---|---|
| 0 | 1, 2, 3, 4, 5, 6 | 7, 8, 9, 10, 11, 12 |
| 1 | 2, 3, 4, 5, 6, 7 | 8, 9, 10, 11, 12, 1 |
| 2 | 3, 4, 5, 6, 7, 8 | 9, 10, 11, 12, 1, 2 |
| 3 | 4, 5, 6, 7, 8, 9 | 10, 11, 12, 1, 2, 3 |
| 4 | 5, 6, 7, 8, 9, 10 | 11, 12, 1, 2, 3, 4 |
| 5 | 6, 7, 8, 9, 10, 11 | 12, 1, 2, 3, 4, 5 |
| 6 | 7, 8, 9, 10, 11, 12 | 1, 2, 3, 4, 5, 6 |
| 7 | 8, 9, 10, 11, 12, 1 | 2, 3, 4, 5, 6, 7 |
| 8 | 9, 10, 11, 12, 1, 2 | 3, 4, 5, 6, 7, 8 |
| 9 | 10, 11, 12, 1, 2, 3 | 4, 5, 6, 7, 8, 9 |
| 10 | 11, 12, 1, 2, 3, 4, | 5, 6, 7, 8, 9, 10 |

Accordingly, after any particular number of impulses has operated the ring from a starting or zero position, a definite set of tubes related to that number of impulses will be conducting and will serve to represent the control number corresponding to that number of impulses.

In the above tabulation, it will be seen that a different pair of tubes constitute the beginning and end of each group of conducting and non-conducting tubes; for instance, the "1" and "6" tubes are the beginning and end tubes of the group of conducting tubes which represents the starting or zero condition of the ring, and these tubes will be conducting at the same time only when the ring is in starting condition. Similarly for each stage of operation of the ring, there will be a particular pair of tubes which will be conducting only when the ring is in that stage of operation and represents a particular control number. This condition is utilized to enable the presettable means to be preset for control by a particular pair of tubes and to respond and cause an indication when a particular control number has caused the differential operation of the ring and has caused that particular pair of tubes to be conducting. As will be explained more fully hereinafter, the potential of the control grids and anodes of the conducting tubes will be different from the potential of similar elements of non-conducting tubes, so that, by making the presettable means responsive only when the potential of similar elements of both tubes of a selected pair is that of conducting tubes, the presettable means can be made to operate only when the desired control number has caused the operation of the ring.

In order that the receiving apparatus may be portable, only one differentially operable vacuum tube ring is provided to count the number of impulses in both bursts and to provide indications of both control numbers which are received. To enable the ring to be used twice to count the number of impulses in each of the bursts, resetting means are provided to restore the ring to its zero or starting condition after the ring has been operated by the first burst of impulses and has had sufficient time to control the presettable means according to the first control number, but before the second burst is received.

In the above tabulation, it is seen that the ring is in its starting condition when the tubes numbered "1," "2," "3," "4," "5," and "6" are conducting. The restoration of the ring to starting condition is effected by removing the potential from the screen grids of the tubes numbered "7," "8," "9," "10," "11," and "12," which renders these tubes non-conducting and, through the trigger action within the pairs, renders tubes "1," "2," "3," "4," "5," and "6" conducting.

The resetting means includes two pairs of tubes, one pair of which causes the removal of the potential from the screen grids of the "7," "8," "9," "10," "11," and "12" tubes to restore the tubes of the ring to starting condition and the other pair of which controls the time of operation of the first pair to allow sufficient time for the ring to be operated and exert its control over the presettable means before the ring is restored to starting condition.

The tubes of the control pair are connected, anode to control grid, to form an unbalanced trigger pair in which one tube is normally conducting and the other tube is normally non-conducting when the receiving apparatus has been put in an operative condition. The burst of negative potential impulses from the impulse amplifying and shaping means are applied to the control grid of the normally conducting tube of the pair, and the first impulse of the burst will render the tube non-conducting. When the normally conducting tube of the control pair becomes non-conducting, the potential of its anode will rise, and this potential rise will be impressed on the control grid of the normally non-conducting tube of the pair and render the normally non-conducting tube conducting. Thus the mode of operation of the tubes of the pair will be changed when the first impulse of the burst is impressed on the normally conducting tube.

The potential of the anode of the normally non-conducting tube of the pair will drop as that tube is rendered conducting, and this drop is impressed on the control grid of the normally conducting tube through a large capacitor to provide a negative bias on the control grid. The circuit including this capacitor has a large time constant and will retain the negative bias on the control grid of the normally conducting tube to maintain this tube non-conducting during the receipt of the impulses of a burst and for a predetermined period of time following the receipt of the last impulse, during which predetermined period of time the charge on the capacitor is dissipated and allows the control grid of the normally conducting tube to again become positive and the tube to become conducting. When the normally conducting tube becomes conducting after the first burst of impulses is received, the potential of its anode will drop, and this drop is used as a negative potential impulse to cause an operation of the tubes of the resetting pair to cause the ring to be restored to its starting condition.

The tubes of the resetting pair are also connected, anode to control grid, to form a trigger pair. The negative potential impulse generated by the operation of the control pair is impressed on the tube of the reset pair which is normally conducting when the receiving apparatus is in operative condition, and causes this tube to become non-conducting. Due to the trigger action, the normally non-conducting tube of the pair will become conducting when the other tube of the pair becomes non-conducting, and this change in the mode of operation of the pair is used to cause the restoration of the ring to its starting condition in the following manner.

A reset relay is included in the anode circuit of the normally non-conducting tube of the reset pair and is energized whenever the normally non-conducting tube of the pair is rendered conducting by the trigger action within the pair. The screen grids of the "7," "8," "9," "10," "11," and "12" tubes of the ring are supplied with potential over normally closed contacts associated with the reset relay so that, when the reset relay is energized, it will open these contacts and remove the screen grid potential from these tubes of the ring to restore the ring to starting condition after its differential operation according to the impulses of the first burst. The screen grid of the normally non-conducting tube of the reset pair is also provided with potential over the contacts associated with this reset relay so that, when the tube becomes conducting and energizes the relay, the potential is removed from its screen grid and the tube is immediately restored to its non-conducting condition. This action restores the reset pair to its normal condition at the same time the ring is restored to its starting condition. In a similar manner, the resetting means will be set in operation by the impulses of the second burst to restore the ring to starting condition, but in the instant embodiment this is an idle operation because no further bursts of impulses are sent in a single operation of the apparatus, and the entire receiving apparatus is restored to standby condition automatically at a suitable time after the second burst of impulses has been received.

A further control is provided for the tubes of the reset pair to enable the pair of tubes to control the initial conditioning of the ring so that the ring will always be in starting condition when the receiving apparatus is changed to an operative condition from a standby condition. When the receiving apparatus is in a standby condition, the normally conducting tube of the reset pair is given a negative bias from a resistance-capacitance network, which will prevent the tube from conducting when cathode heating potential and other operating potentials have been applied to the tube. The relay means, which operates in response to the special control signal to change the receiving apparatus to an operative condition, applies positive potential to this resistance-capacitance network to overcome the bias on the normally conducting tube of the reset pair, but the capacitance in the network slows the effect of the application of positive potential on the control grid to allow sufficient time for the cathodes of the tubes to become heated before the bias on the normally conducting tube is overcome and the tube can operate.

As long as the normally conducting tube of the reset pair is thus biased against conduction, it will tend, due to the trigger connection with the other tube of the reset pair, to cause the other tube to conduct; however, as soon as the other tube begins to conduct, it will energize the reset relay in its anode circuit to remove the potential from its screen grid and from the screen grids of the "7," "8," "9," "10," "11," and "12" tubes of the ring to place the ring in starting condition. Should the cathode of the other tube become properly heated and this tube become operable before the bias is removed from the normally conductive tube of the reset pair, then the other tube will operate periodically to cause the potential to be removed from the screen grids. As soon as the bias is removed from the normally conducting tube of the reset pair, this tube will become conducting and the reset pair will maintain this mode of operation until a negative potential impulse is impressed thereon by the control pair. The temporary bias on the normally conducting tube of the reset pair, therefore, insures that the ring will be placed in starting condition when the receiving apparatus is changed from standby condition to operative condition.

The length of time the bias is on the tube after the operation of the relay means can be controlled by varying the capacity or resistance in the resistance-capacitance network. It has been found that a delay of two or three seconds is sufficient to insure that the cathodes of all the tubes will have been heated and the ring is in proper starting condition.

The resetting means, therefore, puts the ring in proper starting condition before the reception of each burst of impulses to insure that the extent of the differential operation of the ring will correspond to the number of impulses in the bursts, and also enables the ring to be used twice to set up the representations of control numbers according to the number of impulses in the several bursts.

Since, in the disclosed embodiment of the invention, the receiving apparatus is arranged to indicate when two selected control numbers have been received, the presettable means which provides this indication consists of two parts; namely, a first part, which can be preset to respond if the first number of the two selected control numbers is received, and a second part, which can be preset to respond if both of the selected control numbers have been received.

The first part of the presettable means includes a tube having a plurality of control grids. Two of these control grids are connected to the control grids in the pair of tubes of the ring which will be conducting at the same time only when the ring has been operated according to the first number of the selected control numbers.

The potential of the control grid of a tube of the ring will be more positive when the tube is conducting than when the tube is non-conducting, and this condition is used in the following manner to enable the ring to control the presettable means. The control grids of the tube in the first part of the presettable means are so biased that they will prevent conduction in this tube unless the control grids in both tubes of the ring to which they are connected have been made more positive by conduction within these tubes as a result of the operation of the ring according to the control number for which this part of the means was preset to respond. The first part of the presettable means is prepared for operation when the receiving apparatus is changed from standby condition to operative condition and will operate if the number of impulses of the first burst correspond to the control number for which this part is preset. When the tube in the first part of the presettable means becomes conducting, it causes an operation of this part of the presettable means which causes a signal lamp to be lighted to indicate that the first selected control number has been received, prevents the tube from operating again, and prepares the second part of the means for operation.

The second part of the presettable means also contains a tube which can likewise be preset by having control grids connected to control grids of the pair of tubes of the ring which will be conducting only when the ring has been operated according to the other selected control number. The second part of the presettable means is normally inoperative, so that it cannot be operated by the ring when the first burst of impulses has been received; however, the tube of this part is rendered operable by the first part when it operates, and can then be rendered conducting by the ring if the number of impulses of the second burst corresponds to the control number for which the second part is preset. When the second part of the presettable means operates, it causes a second signal lamp to be lighted.

Inasmuch as the second part of the presettable means is rendered operable only if the first number of a selected control number is received, and will operate only if the second number of a selected control number is also received, then the lighting of its signal lamp is an indication that both of the selected control numbers have been received. It is obvious that, instead of merely providing an indication when it operates, the second part could operate a switch or clutch to control the operation of a machine or some other mechanism.

The changing of the presetting of the first and second parts of the presettable means from one pair of control numbers to another involves merely the changing of the connection of several wires from the control grids of one set of tubes of the ring to another, and this can be accomplished very readily.

The invention is not limited to the use of a single presettable means in the receiving apparatus, but can be practiced using more than one of such means. For instance, a receiving apparatus could have one presettable means to start the operation of a machine upon the receipt of certain predetermined control numbers and another presettable means to stop the operation of the machine upon the receipt of different predetermined control numbers.

The operation of a receiving apparatus will now be explained.

The receiving apparatus is preset to respond to the control numbers "9" and "2" by connecting the control grids of the tube in the first part of the presettable means to the control grids of the "10" and "3" tubes of the ring, which tubes of the ring will both be conducting only when the ring has operated according to "9" or the first of said control numbers to be received, and by connecting the control grids of the tube in the second part of the presettable means to the control grids of the "3" and "8" tubes of the ring, which tubes of the ring will both be conducting only when the "2" or the other of the two control numbers has been received. The presettable means will therefore be controlled to give an indication whenever the control numbers "9" and "2" are received in that order.

A suitable switch is closed to place the receiving apparatus in standby condition, in which condition it is ready for operation by the special control signal.

The special control signal is received by the first stage of the radio-frequency portion of the receiving apparatus and is of sufficient duration to cause the operation of relay means to change the receiving apparatus from a standby condition to operative condition, in which condition it can respond to bursts of impulses representing control numbers.

When the relay means operates, it applies cathode heating potential and operating potentials to the tubes of the receiving apparatus to render these tubes operable and also changes the potential on the control grid of the tube constituting the first stage of the radio-frequency portion to change the operation of the tube from that of detection to that of class A, tuned radio-frequency amplification.

The relay means, when operated, also applies potentials to delay circuits associated with the normally conducting tube of the reset pair and with the timing means. The delay circuit associated with the normally conducting tube of the reset pair momentarily prevents the applied potential from being effective on the tube to render it conducting and thus enables the other tube of the pair to operate and place the ring in starting condition with the "1," "2," "3," "4," "5," and "6" tubes conducting before the first burst is received. The delay circuit associated with the timing means delays the effect of the application of the potential on the timing means to render the timing means operable to restore the receiving apparatus to standby condition after a predetermined time during which the receiving apparatus can be operated by the two bursts of control-number-representing impulses and can provide an indication or exert some desired control if the control numbers are those for which the apparatus has been preset.

After the special control signal has placed the receiving apparatus in operative condition, the first burst of impulses will be received and will be impressed as negative impulses on the ring and also on the control pair of tubes of the resetting means. The impulses will cause the pairs of tubes of the ring to change their mode of operation one after another in succession to provide a representation of the control number corresponding to the first burst of impulses.

If nine impulses are included in the first burst, then, when the burst has been received, the "10," "11," "12," "1," "2," and "3" tubes will be conducting. Since the "10" and "3" tubes are conducting at the same time, their control grids will be in their more positive condition and will cause the tube in the first part of the presettable means to become conducting and cause an operation of this means to indicate that the first selected control number has been received. The operation of the first part of the presettable means will prevent the further operation of the tube and will prepare the tube in the second part of the presettable means for operation under control of the ring. In the instant embodiment, the operation of the first part of the presettable means will also light a signal lamp to indicate that the first of the selected control numbers has been received.

During the interval between bursts, and after the ring has had an opportunity to cause an operation of the first part of the presettable means, the control pair of tubes in the resetting means can operate to cause the reset pair to operate and restore the ring to starting condition.

The second burst will next be received and will be impressed on the ring and on the control pair of tubes in the resetting means. The impulses will cause the pairs of tubes of the ring to change their mode of operation one after another, and, if two impulses are included in the second burst, the "3," "4," "5," "6," "7," and "8" tubes will be conducting after the burst has been received.

According to the presetting of the receiving apparatus, the control grids of the tube in the second part of the presettable means are connected to the control grids of the "3" and "8" tubes, and, since these tubes of the ring are both conducting, this tube will be rendered conducting to cause an operation of the second part of the presettable means, which causes a signal lamp to light and indicate that both of the selected control numbers have been received.

The timing means will operate automatically at the end of the predetermined period and will interrupt the holding circuit for the relay means, thus releasing the relay means and restoring the receiving apparatus to its standby condition.

CIRCUITS

The various circuits which supply operating potentials and coordinate the operation of the various parts of the novel control apparatus will now be described.

In this description, the values of the various applied potentials are given with reference to ground. It is not intended that the invention be limited to these particular potentials or to the values of resistance and capacitance specified herein, because the potentials used are merely selected as convenient potentials for the disclosure, and the values of the circuit elements of resistance and capacitance given correspond in relative value to the potentials chosen. It will be obvious that other types of tubes may be used and that other potentials may be used, and, when this occurs, the values of the circuit elements can be adjusted accordingly to maintain the proper relationship between the various parts of the circuits.

SENDING APPARATUS

*Special control signal generating means*

Key 60 (Fig. 1) in the sending apparatus is depressed to cause the special control signal to be generated and sent to the receiving apparatus to change the receiving apparatus from standby condition to operative condition.

The depressed key 60 closes contacts 61, which are effective to connect conductors 62 and 63 to complete a circuit which extends over terminals 64 and 65 and terminals 66 and 67 (Fig. 3) to the transmitter and causes certain operating potentials to be applied to the transmitter to render it operative.

Another circuit is closed by the key to cause the energization of relay means for a period of time required to send the special control signal. This circuit starts from terminal 70, which is at a positive potential of 135 volts, and extends over conductor 71, normally closed contacts 72 of the stop relay, conductor 73 to point 74, and then over conductor 75, contact 76 closed by key 60, conductor 77, capacitor 78 of 4 microfarads, point 79, and over the winding of the relay 80 and point 81 to ground. Relay 80 will be energized while the capacitor 78 is charging and will cause contacts 82 and 83 to be closed during this time.

Contact 82 connects ground potential to conductor 84, which extends over terminal 85, which is connected to terminal 86 (Fig. 3), from which a connection extends to the control grid of the final amplifier of the transmitter and removes the bias therefrom to allow the radio-frequency carrier wave to be transmitted. The carrier wave is transmitted as long as the relay is energized, and this constitutes the special control signal.

Contact 83 closes a short circuit across the winding of the relay 80 to allow the charge on the capacitor 78 to be dissipated without energizing the relay. The short circuit extends from point 79, over point 87, resistor 88 of 50 ohms, closed contact 83, and over point 81 to ground.

When the key is released, a further circuit is closed to connect the other side of the capacitor 78 to ground to provide a short circuit across the capacitor which enables the capacitor to be discharged quickly. This circuit extends from capacitor 78 over contacts 95 closed by the undepressed key, conductor 96, resistor 97 of 250 ohms to point 87, which is connected to ground over the resistor 88 and contacts 83 mentioned above. The capacitor 78, therefore, is quickly restored to its discharged condition and is thereby prepared for further operation.

*Impulse generating means*

Figure 2:
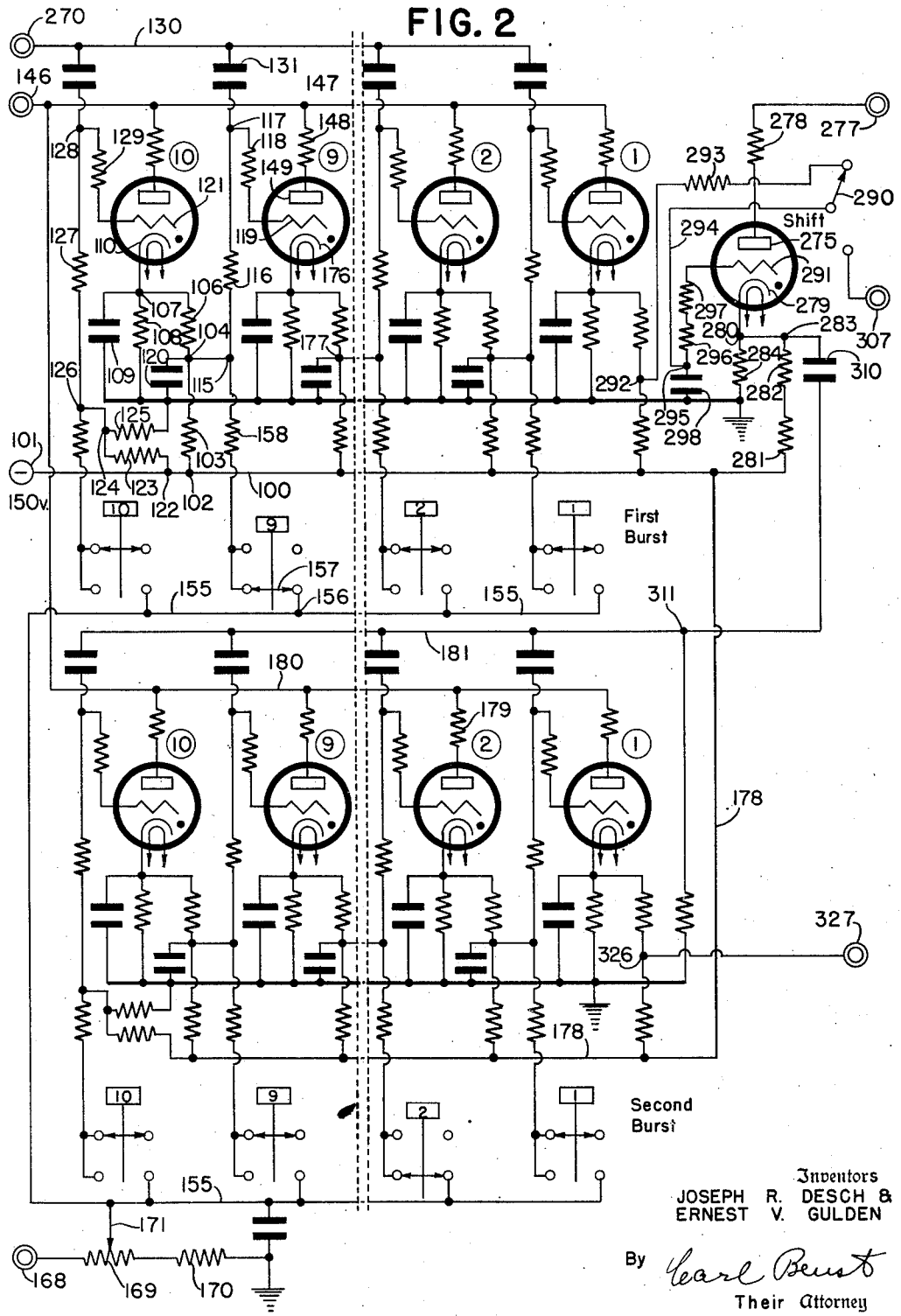
Fig. 2 shows means in the sending apparatus which can be selectively set according to the control numbers; and means controlled by the settable means to generate two bursts of impulses, each of which bursts contains the number of impulses required to represent one of the control numbers.

In the disclosed embodiment, the control is according to two selected control members, so the sending apparatus is provided with means which can generate bursts of impulses according to these numbers. The impulse generating means is shown in Fig. 2.

Two banks of keys are provided for setting up the control numbers to be transmitted, and associated with each bank of keys is a bank of tubes which generates a burst of impulses containing the number of impulses required to represent the control number set up on its related bank of keys.

As many tubes will be included in each bank as there are numbers which may be selected to represent each of the control numbers, and these tubes will generate the different numbers of impulses by which the symbols are represented. Accordingly, the bank will contain a tube for each of the numbers 1 through 10, though in Fig. 2 only the "1," "2," "9," and "10" tubes are shown, the tubes for the numbers "4" through "8" inclusive having been omitted to simplify the showing of these banks because the circuits for these tubes are identical with those shown for the "2" and "9" tubes and the operation of the impulse generating means can be understood readily without a showing of them.

A shift tube "Shift" is provided to shift the generation of the impulses from the first bank to the second bank, either automatically or under control of the manipulative member.

The "Shift" tube and the tubes used in the impulse generating banks are gaseous electron tubes of the type having an internal potential drop of about 15 volts when conducting and having an anode, a cathode, and a control grid which is given a negative bias with respect to the cathode and will prevent the tube from firing until this bias is reduced to less than 12 volts negative with respect to the cathode.

The circuits for supplying potentials to the elements of the tubes of the bank which generates the first burst of impulses and for interconnecting the tubes to coordinate their operation will now be explained.

Negative potential is supplied to the cathodes of the tubes of this bank by means of parallel circuits, one for each tube, extending to ground from a negative potential supply conductor 100, to which a negative potential of 150 volts is applied at terminal 101. The circuit for the "10" tube is representative and extends from the supply conductor 100 at point 102, over resistor 103 of 150,000 ohms, point 104, resistor 106 of 75,000 ohms, point 107, and to ground over resistor 108 of 15,000 ohms and capacitor 109 of .002 microfarad in parallel.

The cathode 110 of the "10" tube is connected to this circuit at point 107 and has a negative potential of approximately 9 volts when the tube is not conducting. When the tube is conducting, the cathode is also conductively coupled to its related anode by the discharge path through the tube, so that the positive potential which is supplied to the anode will also be impressed on the cathode potential supply circuit and will cause the potential of the cathode to rise from a negative potential of 9 volts to a positive potential of about 70 volts.

The cathode heater elements are shown conventionally in the tubes.

Each cathode potential supply circuit is utilized to supply negative biasing potential for the control grid of the next tube in the sequence, which is, in this case, the "9" tube. From the point 104 in the cathode potential supply circuit for the "10" tube, a connection extends through point 115 over resistor 116 of 500,000 ohms, point 117, resistor 118 of 50,000 ohms to the control grid 119 of the "9" tube. With the "10" tube non-conducting, this connection provides this grid with a negative biasing potential of approximately 56 volts. This connection between the cathode potential supply circuit of one tube and the control grid of the next adjacent tube of the sequence enables the potential rise of the cathode of said one tube to reduce the bias of the control grid of the next tube in the sequence to a value below its critical potential and will cause the next tube to fire automatically and become conducting. A capacitor 120 of 100 micro-microfarads is connected between point 104 and ground to delay the application of the potential rise of the cathode to the control grid. With the values given, the tubes will fire one after another at intervals of about 50 micro-seconds; however, the firing rate may be increased or decreased by suitably varying the capacity of the capacitors as 120 which couple points, as 104 in the cathode-to-control-grid connections, to ground.

Since the "10" tube is the first tube in the sequence in a bank, the control grid 121 of this tube is given a biasing potential of the same value as the grids of the other tubes by means of a circuit which is equivalent to the other cathode potential supply circuits and extends to ground from the negative potential supply conductor 100 at point 122, over resistor 123 of 150,000 ohms, point 124, and resistor 125 of 90,000 ohms to ground, to which circuit the grid 121 is connected from point 124, over point 126, resistor 127 of 500,000 ohms, point 128, and resistor 129 of 50,000 ohms.

Each control grid of the tubes of the bank is electrostatically connected to a firing impulse conductor 130, the connection for the grid 119 of the "9" tube extending from point 117 in the grid circuit, over a capacitor 131 of 10 micro-microfarads to the conductor 130. The firing impulses, which are positive potential impulses impressed on conductor 130, tend to reduce the negative bias on the control grids below their critical value, but are not sufficient to overcome the normal negative bias. The firing impulse will be effective to cause a tube to be fired only if that tube has been "primed" or has its grid bias reduced to near the critical point so that the firing impulse can reduce the bias below the critical point and cause the tube to fire and become conducting. The manner in which the tubes are "primed" will be explained hereinafter.

Positive potential is supplied to the anodes of the tubes of the bank by a circuit which extends from terminal 136 (Fig. 1), upon which is impressed a positive potential of 105 volts, and continues over conductor 137, contacts 138, which are closed when the bursts are generated, conductor 139, point 140, resistor 141 of 250 ohms, point 142, resistor 143 of 3,000 ohms, and point 144 to the anode potential supply terminal 145.

Point 142 in this circuit is connected to ground over a capacitor of .1 microfarad, which capacitor absorbs the shock of any abrupt potential application or change in the circuit.

Terminal 145 is connected to terminal 146 (Fig. 2), to which is connected an anode potential supply conductor 147 for the tubes of the bank. Each of the anodes of the tubes of the bank is connected over a resistor of 1,000 ohms to the anode potential supply conductor 147, as, for instance, resistor 148, over which the anode 149 of the "9" tube is connected to the conductor.

When none of the tubes of the bank is conducting, a positive potential of 105 volts is applied to the anodes; however, when one of the tubes is conducting, the potential of its anode will be reduced to about 85 volts due to the drop across the resistors 143 and 148.

At the moment one of these tubes is fired, its cathode will remain at a negative potential of about 9 volts while the capacitor as 109 in the cathode potential supply circuit is charging, and, due to the drop across the resistance in the anode potential supply circuit and the internal potential drop of the tube, the potential of the anode will drop to within about 15 volts of the cathode potential. This drop in the anode potential will cause a drop in the potential of the supply conductor 147, which drop provides a negative potential impulse on the conductor.

When the capacitor as 109 has become charged, the potential of the anode will rise to a positive potential of about 85 volts and will remain at this potential until another tube of the bank is fired and is rendered conducting.

As the anodes of all the tubes of the bank are connected to the conductor 147, a series of negative impulses will occur on the conductor as the tubes of the bank are fired one after another. These impulses are amplified and sharpened and are used to control the modulating means for the radio-frequency transmitter to cause signal impulses to be transmitted to the receiving apparatus, as will be explained more fully hereinafter.

The drop in the potential of conductor 147 as each tube is fired is used to extinguish any previously conducting tube which has its anode connected thereto. The extinguishing action occurs because the potential of all the anodes of these tubes will drop as the potential of the conductor 147 drops, and this will cause the potential of the anode of a previously conducting tube to drop below the potential of its cathode, which potential has risen due to conduction in the tube, and will cause conduction to cease in that tube and enable the control grid to regain control.

The sequential and automatic firing of the tubes of a bank may begin with any selected tube and is initiated by a firing impulse on firing impulse conductor 130. As explained earlier herein, the control grids of the tubes are electrostatically connected to the firing impulse conductor 130 but normally are sufficiently negatively biased that a firing impulse impressed on the conductor will not be effective to reduce the bias below the critical point to cause any of the tubes to be fired and rendered conducting.

In order that a firing impulse will be effective to fire a tube, the tube must be "primed" by having the normal bias of its grid reduced to such a degree that the firing impulse will be sufficient to carry the bias below the critical value and cause the tube to fire and become conducting; accordingly, the selection of the tube with which the sequential operation of the tubes of a bank is to begin can be effected by the selective "priming" of the tubes. The selection of the tube with which the automatic firing of the tubes is to begin also determines the number of impulses that will be in the burst. The keys upon which the control numbers may be set are effective to selectively "prime" their related tubes to control the impulse generating operation of their related bank of tubes.

The upper bank of keys shown schematically in Fig. 2 is the bank upon which the first control number to be transmitted may be set up. Only the keys for the control numbers "1," "2," "9," and "10" are shown, the keys for the numbers "3" to "8" inclusive having been omitted to simplify the illustration of the bank, inasmuch as the circuits for the omitted keys are similar to the circuits shown and the operation of the keys to selectively prime the tubes can be understood from the circuits shown.

The keys of the bank are normally undepressed, and, in their undepressed position, the priming circuits to the tubes are all open. When any key in the bank is depressed, it closes a priming circuit from a positive potential supply conductor 155 to the control grid of its related tube. The "9" key of this bank is shown depressed to complete the priming circuit to the control grid 119 of the "9" tube, the circuit extending from point 156 on the positive potential supply conductor 155, over contact 157 of the depressed "9" key, and over resistor 158 of 300,000 ohms to point 115 in the circuit to control grid 119.

The potential supply conductor 155 is provided with suitable positive potential from a circuit which starts at terminal 159 (Fig. 1), which has a positive potential of 150 volts applied thereto, and continues over conductor 160, contacts 161, which are closed during the generation of impulses, conductor 162, point 163, conductor 164, point 165, and conductor 166 to terminal 167, which is connected to terminal 168 (Fig. 2), and from this terminal to ground over resistors 169 and 170 of 50,000 ohms each, to which circuit the potential supply conductor 155 is connected by an adjustable potential tapping member 171, which cooperates with resistor 169 and enables the conductor 155 to be given the proper potential, which, in the instant embodiment, is about 105 volts.

The positive potential which is applied to the control grid 119 of the "9" tube by the priming circuit reduces the negative biasing potential of the control grid almost to its critical point, so that, when the firing impulse is impressed on the tubes, the bias on the control grid of the "9" tube will be reduced to less than 12 volts negative with respect to the potential of the cathode, and the tube will fire. In a similar manner, the closure of a priming circuit to any other tube by the depression of its related key will select that tube to begin the sequential and automatic firing of the tubes of the bank.

At the moment the "9" tube is fired, its anode potential will drop momentarily due to the resistors 143 and 148 in the anode potential supply circuit and the capacitor as 109 in the cathode potential supply circuit, causing a negative potential impulse to occur on the conductor 147, terminal 146 (Fig. 2), and terminal 145 (Fig. 1). The negative potential impulse resulting from the potential drop at terminal 145 constitutes the first generated impulse of the burst. As the capacitor, as 109, in the cathode potential supply circuit for the "9" tube charges, the potential of the cathode 176 of the "9" tube will rise and, through the connection (not shown) between point 177 in its supply circuit and the control grid of the "8" tube, will cause the potential of the control grid of the "8" tube to rise beyond its critical value, which causes the "8" tube to fire and become conducting. As the "8" tube fires, the potential of its anode will also drop momentarily and cause a drop in the potential of the conductor 147, which drop constitutes the second impulse of the burst and also causes the previously conducting "9" tube to be extinguished. The "8" tube will cause the "7" tube to be fired automatically, and in a similar manner the "6," "5," "4," "3," "2," and "1" tubes will be fired automatically in sequence one after another. As each tube is fired, it will cause a momentary drop in the potential of conductor 147, so that, when the "1" tube has fired, the nine negative potential impulses which are required in the first burst of impulses, when the "9" key is depressed, will have been generated.

The bank of tubes which generates the second burst of impulses is substantially the same as the one just described.

Negative potential for the cathodes and control grids of the tubes of this bank is obtained from a conductor 178, which extends from conductor 100.

The anodes of the tubes are connected over 1,000-ohm resistors, as 179, to conductor 180, which is connected to the potential supply conductor 147 for the bank of tubes which generates the first burst of impulses. As the tubes of the second bank are fired, they will generate negative potential impulses which will cause the potential of conductor 147 and terminal 145 (Fig. 1), which is connected thereto, to vary in the same manner as did the firing of the tubes of the bank which generated the first burst. These impulses are also amplified and sharpened and are used to control the output of the radio-frequency transmitter to cause the second burst of signals to be transmitted.

Priming circuits from the potential supply conductor 155 to the control grids of the tubes may selectively be closed by the keys upon which the second control number is set. In Fig. 2, the priming circuit for the "2" tube for this bank is shown closed by the depressed "2" key to render this tube responsive to a firing impulse impressed on the firing impulse conductor 181 for this bank. The firing of this tube will generate an impulse and will cause the "1" tube to fire automatically and generate a second impulse, thereby to produce the two impulses which are required in the burst when the "2" key is depressed.

The firing impulse conductor 181 is not connected to the firing impulse conductor 130 for the bank which generates the first burst of impulses, nor does it have the firing impulses impressed thereon by the means which impresses the impulses on conductor 130. The control means which control the initiation and termination of the sending of the bursts of impulses and which apply the firing impulses on conductors 130 and 181 will be explained more fully hereinafter.

*Impulse amplifying and sharpening means*

As mentioned earlier herein, the impulses which are generated by the banks of tubes are amplified and sharpened and are used to control the modulation of the output of the radio-frequency transmitter.

The means for amplifying and sharpening the impulses before they are used to control the modulating means for modifying the potential of the control grid of the final amplifier of the radio-frequency transmitter to modulate the carrier wave and cause signals to be transmitted is shown in Fig. 1 and consists of a pair of vacuum tubes 185 and 186.

Tube 185 has a zero bias and is normally conducting. The anode 187 has positive potential applied thereto from conductor 164, which is at a potential of 150 volts, the connection being from the conductor, over resistor 188 of 250 ohms, point 189, resistor 190 of 5,000 ohms, and point 191. Point 189 is by-passed to ground over a stabilizing capacitor of .1 microfarad. Screen grid 192 is connected over point 193 and resistor 194 of 250 ohms to point 140 on conductor 139, which has a positive potential of 105 volts. A stabilizing capacitor of .1 microfarad is connected between point 193 and ground. The cathode 195 and the suppressor grid 196 are directly connected to ground, and the control grid 197 is connected to ground over point 198 and resistor 199 of 25,000 ohms.

Point 198 in the circuit of control grid 197 is coupled over capacitor 200 of 10 micro-microfarads to point 144, to which terminal 145 is connected. As explained earlier herein, the potential variation of terminal 145 as the tubes of the two banks are fired will result in two bursts of negative impulses which are impressed on the control grid 197 and reduce conduction in tube 185.

Since tube 185 is normally conducting, its anode 187 will normally have a positive potential of about 20 volts due to the drop across resistor 190, but, as conduction is reduced in the tube by the negative potential impulses impressed on the control grid 197, the potential of the anode 187 will rise toward 150 volts and will provide positive impulses which are used to control conduction in tube 186.

Tube 186 is normally non-conducting but is rendered conducting each time a positive potential impulse occurs on the anode 187 of tube 185. Of the elements of tube 186, the anode 205 is supplied with a positive potential of 240 volts from terminal 206 over conductor 207, point 208, resistor 209 of 250 ohms, point 210, resistor 211 of 5,000 ohms, and point 212; the screen grid 215 is connected over point 216 and resistor 217 of 250 ohms to conductor 207; and the cathode 218 and the suppressor grid 219 are directly connected to ground. Point 210 in the anode circuit and point 216 in the screen grid circuit are by-passed to ground over stabilizing capacitors of .1 microfarad.

Control grid 220 of tube 186 is given a negative bias by being connected to a circuit which starts at terminal 221, upon which a negative potential of 150 volts is impressed, and continues over conductor 222, point 223, and resistors 224 and 225 of 50,000 ohms to ground. The control grid 220 is connected to this circuit over point 226, resistor 227 of 25,000 ohms, point 228, and an adjustable potential tapping member 229, which cooperates with resistor 225 to provide the desired negative bias for the control grid. Point 228 is by-passed to ground over a stabilizing capacitor of .1 microfarad.

Point 226 in the control grid circuit is electrostatically coupled over a capacitor 230 of 10 micromicrofarads to point 191 in the anode circuit for tube 185. This coupling enables the positive potential impulses which occur on point 191 when conduction is reduced in tube 185 to reduce the negative bias on the control grid of tube 186 and render that tube conducting.

Since tube 186 is normally non-conducting, its anode will normally have a positive potential of 240 volts, but this potential is reduced by the drop across resistor 211 each time the tube becomes conducting in response to impulses impressed on control grid 220, and these potential drops which occur at anode 205 are used to control the operation of the modulating means for the transmitter to cause the required numbers of signal impulses to be transmitted. The connection to the modulating means extends over conductor 231 from point 212 in the anode circuit and will be explained more fully hereinafter.

In the above manner, the negative impulses which are generated by the firing of the tubes in the banks are amplified and sharpened to provide the desired control over the output of the radio-frequency transmitter.

*Control number transmission initiating and terminating means*

When the keys have been set according to the desired control numbers to prime their related tubes, and when the special control signal has been sent, the sending of the first burst of impulses may be initiated. Due to the fact that the special control signal causes cathode heating potential to be applied to the tubes of the receiving apparatus, it is necessary to wait two or three seconds after the sending of the special control signal before initiating the sending of the bursts of impulses. This interval will insure that the cathodes of the tubes of the receiving apparatus will have time to be heated sufficiently to operate properly when the bursts of impulses are received.

The transmission of the control numbers is initiated by the movement of the manipulative member 236 upwardly as shown in Fig. 1, which closes an energizing circuit for the starting relay 237, the circuit extending from conductor 75 and continuing over contacts 238, which have been closed by the manipulative member 236, conductor 239, point 240, and over the winding of the starting relay 237 and point 241 to ground.

Contacts 232, which are closed by the manipulative member 236, complete a circuit which extends from point 233 on conductor 71, over conductor 234 and contacts 232 to point 74, to shunt the contacts 72 and prevent the release of the starting relay 237 as long as the manipulative member 236 is in its upper position. This will prevent repeated initiation of the sending of the bursts if the member is retained in moved position until after the stop relay 244 is operated.

When the starting relay 237 is energized, it closes contacts 138, 161, 242, and 243. Contact 242 completes a holding circuit for the relay from terminal 70, which has a positive potential of 135 volts, over conductor 71, normally closed contacts 72 of stop relay 244, thence over conductor 73, normally closed contacts 245 of the Release key, conductor 246, contacts 242, point 240, and to ground over the winding of the starting relay. This circuit will maintain the starting relay energized until either the stop relay or the Release key is operated.

Contacts 243 connect conductors 62 and 63 to complete the circuit which extends to the transmitter and causes certain operating potentials to be applied thereto to render the transmitter operative and enable the transmission of the two bursts of impulses to be made.

As mentioned earlier herein, contacts 138 and 161 connect terminals 136 and 159 to various parts of the apparatus to supply these parts with operating potential during the tranmission of the bursts of impulses.

In addition of the circuits traced earlier herein, the circuit completed over contacts 161 also causes the firing of the start tube 250 (Fig. 1), which is effective to impress a firing impulse on conductor 130 (Fig. 2) to initiate the generation of the first burst of impulses. Start tube 250 is a gaseous electron tube of the type described earlier herein. This tube has its cathode 251 connected to ground over point 252 and resistor 253 of 20,000 ohms.

The anode 254 has a positive potential of 150 volts applied thereto from point 255 on conductor 164 over resistor 256 of 250 ohms, points 257 and 258, and resistor 259 of 7,500 ohms whenever the starting relay is energized to connect conductor 164 to the terminal 159. Point 257 in this circuit is by-passed to ground over a stabilizing capacitor of .1 microfarad.

Before the starting relay is energized, the control grid 260 of the start tube 250 is given a negative potential bias of 150 volts by a circuit which extends from conductor 222, to which a negative potential of 150 volts is applied at terminal 221; and continues over resistor 261 of 300,000 ohms and capacitor 262 of 8 microfarads in parallel, conductor 263, point 264, and resistor 265 of 500,000 ohms. Anode 254 and the other parts connected to conductor 164 are also given a negative potential of 150 volts before the starting relay 237 is energized, this being due to the connection from joint 264 over resistor 266 of 200,000 ohms to point 258 in the anode circuit, which applies negative potential to the anode 254 and the other parts connected thereto over conductor 164.

When the starting relay 237 closes contacts 161 and applies the positive potential of 150 volts to conductor 164 and the parts connected thereto, it also causes this potential to be applied over resistor 266 to the point 264 in the circuit to the control grid 260 to reduce the negative bias thereon and cause the tube to fire and become conducting. Resistor 266 and capacitor 262 cooperate to delay the effect of the applied positive potential on the control grid 260 to allow the voltage applied to the various parts by the closing of the contacts 161 to reach a steady state before the start tube is fired.

The potential of the control grid 260 changes from negative to positive after the application of positive potential thereto and thus enables the start tube 250 to fire and become conducting, the firing occurring as soon as the control grid 260 is less than 12 volts negative with respect to its related cathode 251.

Resistor 253 in the cathode circuit will cause the potential of the cathode 251 to rise sharply when the tube becomes conducting, and this rise is utilized as the firing impulse for the bank of tubes which generates the first burst of impulses. The firing impulse is derived from point 252, which is coupled over capacitor 267 of .001 microfarad, and point 268 to terminal 269, which is connected to terminal 270 (Fig. 2), to which the firing impulse conductor 130 is connected. Point 268 (Fig. 1) is connected to ground over a resistor 271 of 15,000 ohms. Capacitor 267 and resistor 271 cooperate to sharpen the firing impulse, enabling the effect of the firing impulse to be removed from the control grids of the other tubes of the bank before conduction in the previously "primed" tube is effective to cause the next tube in the sequence to be fired and rendered conducting in the normal manner, thus insuring substantially uniform intervals between the impulses of the burst. After the generation of the impulses of the first burst has been initiated, the tubes of the bank will fire one after another automatically until the "1" tube has fired to generate the last impulse of the first burst.

The initiation of the generation of the second burst of impulses is obtained by firing the "Shift" tube (Fig. 2), which tube may be fired either automatically or by a further operation of the manipulative member 236.

As mentioned previously, the "Shift" tube is a gaseous electron tube of the type previously described. The anode 275 of this tube has a positive potential of 150 volts applied thereto from conductor 164 (Fig. 1) whenever the starting relay 237 is energized, the connection extending from point 255 on conductor 164 over resistor 256, points 257 and 258, and terminal 276, which is connected to terminal 277 (Fig. 2), to which the anode 275 is connected over a resistor 278 of 1,000 ohms. The cathode 279 of this tube is given a negative potential of about 9 volts whenever the tube is not conducting, which potential is obtained by connecting the cathode 279 at point 280 in a circuit which extends to ground from negative potential supply conductor 189, over resistors 281 and 282 of 300,000 and 90,000 ohms, respectively, points 283 and 280, and resistor 284 of 25,000 ohms. As in the case of the other gaseous tubes, the cathode potential will become positive when the tube conducts.

With the switch 290 (Fig. 2) in the position as shown, the "Shift" tube is connected for automatic operation. Under these conditions, the control grid 291 is given a normal negative bias of about 56 volts from the cathode potential supply circuit for the "1" tube of the bank, which generates the first burst of impulses and is fired automatically by the "1" tube in a manner similar to that by which the tubes of the bank are fired in succession. The circuit for the control grid 291 extends from point 292 in the cathode potential supply circuit for the "1" tube, over resistor 293 of 500,000 ohms, switch 290, conductor 294, point 295, and resistors 296 and 297 of 500,000 ohms and 50,000 ohms, respectively. Point 295 in this circuit is connected to ground over a capacitor 298 of .25 microfarad, which delays the firing of the "Shift" tube after the firing of the "1" tube to cause a relatively long interval or space to occur between the bursts. It has been found that the interval should be greater than 5 milliseconds in order to allow sufficient time for certain operations to take place in the receiving apparatus.

With the switch 290 in its other position, the "Shift" tube is connected to be fired by the further operation of the manipulative member 236 (Fig. 1). The control grid 291 of the "Shift" tube is given a negative bias of 150 volts by means of a circuit which extends from point 301 (Fig. 1) on conductor 222, over conductor 302, resistor 303 of 10,000 ohms, contacts 304, conductor 305, terminal 306, which is connected to terminal 307 (Fig. 2), to which the control grid 291 is connected over conductor 294, point 295, and resistors 296 and 297. When the manipulative member 236 is moved to its lower position, it will open contacts 304 to disconnect the grid 291 from the source of negative potential and will close contacts 308, which connect the grid to ground over a resistor 309 of 500,000 ohms. The removal of the negative potential and the grounding of grid 291 by the operation of the manipulative member 236 will cause the "Shift" tube to fire.

The potential of the cathode 279 of the "Shift" tube will rise sharply when that tube is fired, and this rise is used as the firing impulse for the other bank of tubes, the firing impulse conductor 181 for this bank being coupled over capacitor 310 of .001 microfarad to point 283 in the cathode potential supply circuit for the "Shift" tube. Point 311 on the firing impulse conductor 181 is connected to ground over a resistor of 15,000 ohms.

The firing impulse on conductor 181 will fire the selectively primed tube in this bank to initiate the generation of the second burst of impulses. The tubes in the bank will then be fired automatically until the "1" tube has fired and has generated the last impulse of the second burst. The cathode potential rise of the "1" tube as it becomes conducting is utilized to fire a stop tube 315 (Fig. 1), which causes the termination of the transmission by energizing the stop relay 244, which opens the holding circuit for the starting relay.

The stop tube is a gaseous electron tube of the type described earlier herein. The cathode 316 of this tube is directly connected to ground. The anode 317 is given a positive potential of 150 volts from conductor 162, which has this potential applied thereto while the impulse generating operation is taking place, the circuit extending to the anode from conductor 162, over point 318, winding of the stop relay 244, point 319, conductor 320, and resistor 321 of 10,000 ohms. Control grid 325 is given a normal negative bias of about 56 volts from the cathode potential supply circuit for the "1" tube in the bank which generates the second burst of impulses, the connection being from point 326 (Fig. 2) in the cathode potential supply circuit, over terminal 327, which is connected to terminal 328 (Fig. 1), to which the control grid 325 is connected over point 329 and resistors 330 and 331 of 500,000 and 50,000 ohms, respectively. Point 329 in this connection is connected to ground over a capacitor of 100 micro-microfarads.

Until the stop tube is fired, there will be no current in its anode circuit, and the stop relay will not be energized, but, as soon as the tube is fired, stop relay 244 will be energized and open contacts 72, which break the holding circuit for the starting relay. The starting relay 237 will be deenergized when its holding circuit is broken and will open contacts 138, 161, 242, and 243. Contact 242 will open the holding circuit; contacts 138 and 161 will remove the positive potentials of 105 volts and 150 volts from the various parts of the sending apparatus; and contacts 243 will open the circuit which causes certain operating potentials to be applied to the transmitter. Thus, with the release of the starting relay 237, the sending apparatus is restored to the condition in which it was prior to the sending of the special control signal.

*Radio-frequency transmitter and controls therefor*

Figure 3:
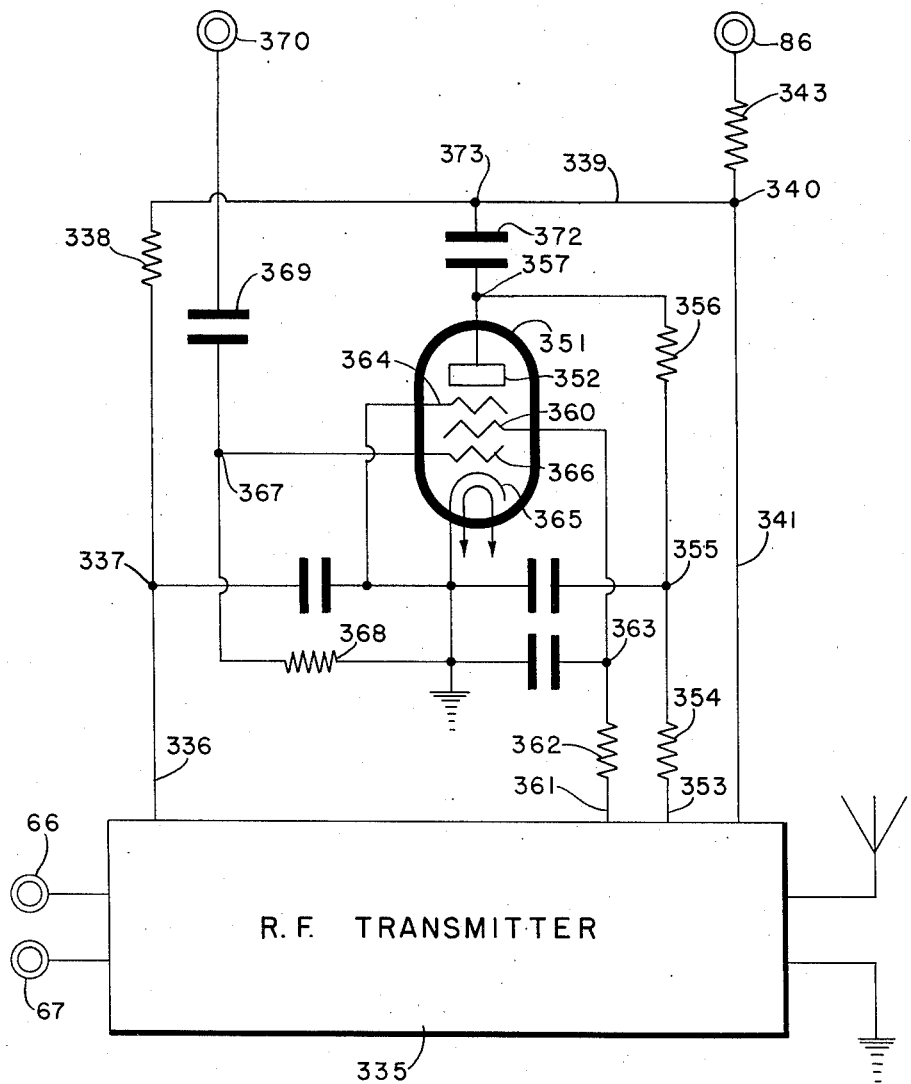
Fig. 3 shows certain controls associated with the radio-frequency transmitter and also includes a diagrammatic showing of the transmitter.

The radio-frequency transmitter which sends the control signal and the bursts of impulses to the receiving apparatus is of conventional design, and accordingly the transmitter and its power supply are shown generally at 335 in Fig. 3. The final stage of amplification in the transmitter is biased to cut-off, so that normally the radio-frequency carrier wave is not transmitted, but this bias is removed when it is desired to send the special control signal or the bursts of control-number-representing impulses.

The transmitter and the modulating means therefor, which are shown in Fig. 3, are normally in a standby condition, in which the heating potentials and grid potentials are applied to the tubes therein. Plate potentials are applied to the various tubes when conductors 62 and 63 (Fig. 1), which are connected, respectively, over terminals 64 and 65 to terminals 66 and 67 (Fig. 3), are connected together, and this application of anode potentials renders the transmitter operative when the special control signal and the bursts of impulses are to be transmitted.

Inasmuch as the radio-frequency transmitter and the power supply therefor may be of any conventional design, they will not be described herein in detail, and only those details which are necessary to show how the transmitter is controlled by the special control signal generating means and the impulse generating means will be given.

The transmitter to be used is one in which the final stage of amplification or output stage can be biased to cut-off by a negative potential of 350 volts applied thereto. This stage normally has this bias applied thereto, so that normally there will be very little or no radio-frequency output obtained from the transmitter. When the bias is reduced by the special control signal generating means or by the impulse generating means, radio-frequency output will occur to cause the desired signals to be transmitted.

The manner in which the bias is reduced to cause different signals to be transmitted will now be described.

A negative potential of 350 volts is obtained from the power supply of the transmitter and is applied to the final stage of amplification over conductor 336, point 337, resistor 338 of 10,000 ohms, conductor 339, point 340, and conductor 341, which extends to the final stage to cause this stage to be biased to cut-off. Point 337 in this circuit is by-passed to ground over a stabilizing capacitor of 4 microfarads.

While relay 80 (Fig. 1) is energized to generate the special control signal, contacts 82 apply ground to conductor 84, which conductor is connected over terminals 85 and 86 (Fig. 3) and resistor 343 of 3,500 ohms to point 340 in the biasing circuit for the final stage, and reduces the bias sufficiently to allow the radio-frequency carrier wave to be transmitted to form the square-topped, special control signal.

The modulating means, which includes the normally conducting vacuum tube 351, is controlled by the amplified and shaped impulses of the bursts and controls the modification of the bias of the final stage of the transmitter to allow the radio-frequency wave to be transmitted for short intervals of time corresponding to said impulses.

Anode 352 of tube 351 has a positive potential of 475 volts applied thereto from the power supply of the transmitter whenever conductors 62 and 63 (Fig. 1) are connected. This potential is supplied over conductor 353, resistor 354 of 125 ohms, point 355, resistor 356 of 6,000 ohms, and point 357. Point 355 in this circuit is by-passed to ground over a stabilizing capacitor of 8 microfarads. Inasmuch as tube 351 is normally conducting, its anode 352 will have a normal potential of about 20 volts due to the drop across resistor 356.

Screen grid 360 has a positive potential of 220 volts applied thereto from the power supply for the transmitter over conductor 361, resistor 362, and point 363, which point is by-passed to ground over a stabilizing capacitor of 4 microfarads. Due to conduction in tube 351, the potential on the screen grid 360 will drop to about 110 volts.

Suppressor grid 364 and cathode 365 are directly connected to ground, and control grid 366 is connected to ground over point 367 and resistor 368 of 50,000 ohms.

Control grid 366 is also coupled to conductor 231 (Fig. 1), which has the amplified and sharpened impulses impressed thereon. This coupling extends from point 367, over capacitor 369 of 250 micro-microfarads, terminal 370, which is connected to terminal 371 (Fig. 1), to which conductor 231 is connected. Each of the negative impulses on conductor 231 will be effective to reduce conduction in tube 351 and cause the potential of anode 352 to become more positive. These potential changes of anode 352 are impressed as positive impulses on the conductor 339 by means of capacitor 372 of .01 microfarad, which couples points 357 and 373, and enable the bias of the final stage to be modified to allow the transmitter to transmit the radio-frequency wave for short periods of time corresponding to the duration of the impulses.

The transmitter, accordingly, can be controlled to send out the special control signal and the two bursts of impulses, each burst of which contains the desired number of control-number-representing impulses.

RECEIVING APPARATUS

Figure 4:
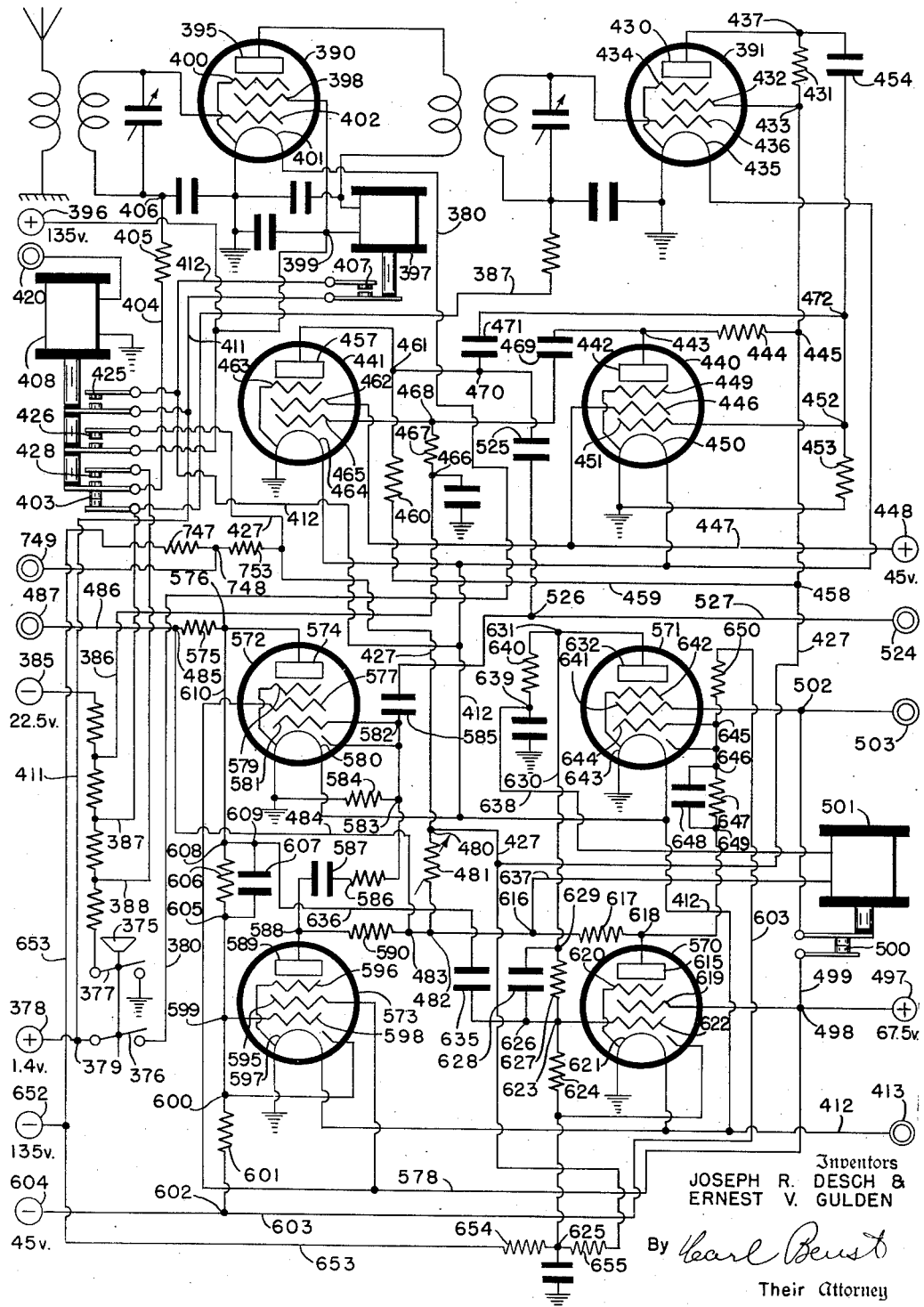
Fig. 4 shows a radio-frequency responsive means of the receiving apparatus; a means for amplifying the received signals; a means for changing the receiving apparatus from a standby condition to an operative condition; and a means for controlling the restoring of a differentially operable electronic means to its starting condition.

The portable, battery-operated receiving apparatus which has been chosen to illustrate the invention is shown in Figs. 4, 5, and 6. Due to the fact that the receiving apparatus is to be portable and battery-operated, suitable tubes and potentials have been used; however, when the features of portability and operation from batteries are not particularly desired, other tubes and potentials may be used in the receiving apparatus without departing from the invention.

For simplicity, the batteries which supply the various potentials for the operation of the receiving apparatus will not be shown, the potential supplies being shown merely as terminals which can supply the desired potentials.

As explained earlier herein, the receiving apparatus is normally in a standby condition and can be changed to an operative condition upon the receipt of a special control signal.

The receiving apparatus is placed in standby condition by the operation of the member 375 (Fig. 4), which closes the contacts 376 and 377. Contact 376 completes a circuit from terminal 378, which is at a positive potential of 1.4 volts, over point 379, contact 376, and conductor 380 to the cathode of one of the tubes of the radio-frequency portion of the receiving apparatus to apply cathode heating potential thereto. Contact 377 closes a circuit through a potential dividing resistance network extending between terminal 385, which has a negative potential of 22.5 volts, and ground and provides conductors 386, 387, and 388 with negative potentials of 15, 9, and 2 volts, respectively. The negative potential of 9 volts on conductor 387 is used to supply bias to the control grid of the tube in the radio-frequency portion of the receiving apparatus to which the cathode heating potential was supplied over contact 376. The application of these potentials by contacts 376 and 377 renders this tube operable to detect the special control signal which causes the receiving apparatus to be placed in operative condition, in which condition it can respond to the bursts of control-number-representing impulses.

*Radio-frequency operable means*

The radio-frequency portion of the receiving apparatus is shown as a simple form of radio receiver containing tubes 390 and 391 (Fig. 4), which are 1L4 type tubes. Tube 390, which may be considered as the first stage, is the tube that was made operable by the operation of member 375 to place the receiving apparatus in standby condition.

Of the various elements of tube 390, anode 395 has a positive potential of 135 volts applied thereto from terminal 396 over a circuit which includes the winding of relay 397; screen grid 398 is given a similar potential from point 399 in this circuit; suppressor grid 400 and cathode 401 are grounded; and control grid 402 is supplied with a negative potential of 9 volts from conductor 387 over normally closed contacts 403, conductor 404, resistor 405, and point 406. This potential biases the tube to cut-off, but the potential of this grid can be modified by the received signal, so that tube 390 operates as a detector when the receiving apparatus is in standby condition.

When the special control signal is received, it will be of sufficient duration to cause the sensitive relay 397 in the anode circuit for tube 390 to be energized and close its contacts 407 to complete a circuit to relay 408, which operates and changes the receiving apparatus from standby condition to operative condition.

The circuit closed by contacts 407 extends from point 379, over conductor 411, over contacts 407, conductor 412, terminal 413, which is connected to terminal 414 (Fig. 6), thence over point 415, conductor 416, normally closed contacts 417 of the restoring relay 418, terminal 419, which is connected to terminal 420 (Fig. 1), and to ground over the winding of relay 408. In addition to causing the relay 408 to operate, this circuit will apply heating potential to the cathodes of the various tubes of the receiving apparatus.

Relay 408 will close contacts 425, which connect conductors 411 and 412 to shunt out contacts 407 and provide a holding circuit for the relay 408 after relay 397 has been deenergized. The holding circuit will maintain relay 408 energized and will maintain the cathode heating potential applied to the tubes until the restoring relay 418 is operated by the timing means to restore the receiving apparatus to standby condition at a predetermined time after it was rendered operative.

Contact 426, when closed by relay 408, connects terminal 396, which is at a positive potential of 135 volts, to conductor 427. Conductor 427 provides anode potential and other operating potentials for the tubes to render them operable; and also applies positive potential to delay circuits to start their operation. The operation of the tubes and the delay circuits will be explained more fully hereinafter.

When relay 408 is energized, it will open contact 403 and will close contact 428. This will disconnect the control grid 402 from conductor 387, which is at a negative potential of 9 volts, and connect the control grid to conductor 388, which is at a negative potential of 2 volts. This shift in the potential on the control grid 402 will change the operation of tube 390 from that of detection when the receiving apparatus is in standby condition to that of class A, tuned radio-frequency amplification when the receiving apparatus is in operative condition.

Tube 391, which can be considered as the second stage of the radio-frequency portion, is inoperative when the receiving apparatus is in standby condition. When relay 408 operates to apply operating potentials to the tubes, it applies cathode heating potential over conductor 412 and anode and screen grid potential over conductor 427, thus rendering the tube operative.

Of the elements of tubes 391, anode 430 will be supplied with a positive potential of 135 volts from conductor 427 over resistor 431 of 100,000 ohms, and screen grid 432 will be supplied with a similar potential from point 433 on conductor 427; suppressor grid 434 and cathode 435 will be directly connected to ground; and control grid 436 will be given a negative potential of 9 volts from conductor 387. This potential on control grid 436 will bias tube 391 to cut-off; however, control grid 436 is also inductively coupled to the output of tube 390, and the voltage on the grid will be modified by the output of tube 390 to enable tube 391 to operate as a detector.

Since the tube 391 is biased to cut-off, its anode 430 will normally be at 150 volts, but, as the bursts of impulses are received and conduction occurs in the tube, the potential of the anode 430 will drop and provide a series of negative potential impulses at point 437 in the anode circuit.

These impulses from the detector tube 391 are to be used to operate the differentially operable means and should be of constant amplitude and shape. Due to variations in the strength of the received signals, the amplitude of the output impulses from tube 391 will vary, and this makes it desirable to amplify and shape the output impulses before they are applied to the differentially operable means.

*Impulse amplifying and shaping means*

The means for amplifying and shaping the output impulse consists of tubes 440 and 441 (Fig. 4), which are 1S4 type tubes.

Tube 440 is normally conducting when the receiving apparatus is in operative condition. The anode 442 is connected over point 443 and resistor 444 of 20,000 ohms to point 445 on the potential supplying conductor 427. Screen grid 446 is given a positive potential from conductor 447, which is connected to terminal 448, which supplies a positive potential of 45 volts. Suppressor grid 449 and cathode 450 are directly connected to ground, and control grid 451 is connected to ground over point 452 and resistor 453 of 10,000 ohms.

Control grid 451 is also coupled over a capacitor 454 of 25 micro-microfarads to point 437 in the anode circuit of tube 391 to enable the negative potential output impulses to reduce conduction in tube 440. Since tube 440 is operating with zero bias, its transconductance is very high and it is sensitive to negative impulses. The negative impulses will reduce conduction in tube 440 and cause the anode potential to rise sharply and provide amplified positive impulses which are used to control conduction in tube 441.

Tube 441 is adjusted to operate as a class C amplifier. Anode 457 is given a positive potential of 135 volts from point 458 on conductor 427, over conductor 459, resistor 460 of 20,000 ohms, and point 461. Screen grid 462 is given a positive potential of 45 volts from conductor 447. Suppressor grid 463 and cathode 464 are directly connected to ground. Control grid 465 is given a negative potential of 15 volts over conductor 386, point 466, resistor 467 of 10,000 ohms, and point 468. Point 466 is by-passed to ground over a stabilizing capacitor of .1 microfarad.

Point 468 in the circuit to control grid 465 is coupled over capacitor 469 of 25 micro-microfarads to point 443 in the anode circuit for tube 440, which enables the positive potential impulses formed by the operation of tube 440 to control the operation of tube 441. Each impulse will cause tube 441 to become conducting and, due to resistor 460 in its anode circuit, cause the potential of its anode 457 to drop to provide a negative impulse.

Point 461 in the anode circuit for tube 441 is coupled over point 470 and capacitor 471 of 10 micro-microfarads to point 472 in the circuit to the control grid 451 of tube 440 to couple the negative impulse output of tube 441 to the control grid 451 of tube 440 to insure a complete operation of this pair of tubes each time an impulse is impressed thereon from detector tube 391.

The time constants in the circuits associated with tubes 440 and 441 are small, which means that the recovery time is short, and complete excursions of operation of these tubes occur in time intervals small by comparison with those which occur between the impulses of a burst. The output from these tubes, therefore, consists of two bursts of sharp negative potential impulses having sufficient and uniform amplitude to cause the proper operation of the differentially operable means to set up direct representations of control numbers corresponding to the impulses of the bursts. The impulses derived from these tubes are also used to control the operation of the means which restores the differentially operable means to its zero or starting condition.

Differentially operable means

As explained earlier herein, the differentially operable means which is used to set up a representation of a control number corresponding to the number of impulses in a burst is an electronic counting ring. In the course of the normal operation of the control apparatus, the ring will be differentially operated twice, once for each of the bursts, to provide representations of the two control numbers.

The ring shown in Fig. 5 is made up of twelve tubes to provide the required capacity, and, because the receiving apparatus is to be portable and battery-operated, 1S5 type battery-operated tubes are used. The tubes of the ring are connected to form six trigger pairs and are also connected in a priming network which, together with the trigger connections, is effective to render the pairs responsive to change their mode of operation, one pair at a time, in response to negative potential impulses which are applied to all the tubes of the ring and which correspond to the impulses of the bursts.

It is to be understood that, when the features of portability and battery operation are not desired, other types of electronic counting rings using other types of tubes may be used to set up representations of the control numbers.

The 1S5 tubes have the characteristics of sharp cut-off, low D. C. plate resistance when the grid is at zero potential, and low inter-electrode capacitance, and enable a stable, high-speed ring to be produced. When this type of tube is used, the plate of the diode portion of the tube is directly connected to the control grid of the pentode portion of the tube.

The tubes of the ring are inoperative when the receiving apparatus is in standby condition and are made operative when relay 408 is energized to change the receiving apparatus to operative condition.

When relay 408 is energized and connects conductor 427 to terminal 396, anode potential is supplied to the ring from conductor 427 (Fig. 4) over point 480, variable resistor 481, points 482 and 483, conductor 484, point 485, conductor 486, terminal 487, which is connected to terminal 488 (Fig. 5), to which is connected the potential supply conductor 489 for the anodes of the ring. The variable resistor 481 is so adjusted that, when the receiving apparatus is in operative condition, the anodes will be given a positive potential of about 125 volts. The anode of each tube is connected to the potential supply conductor 489 over a resistor of 50,000 ohms, the connection for the anode 490 of the "1" tube being representative and extending from point 491 on the supply conductor 489 over the resistor 492 and point 493 to the anode.

The screen grids of the "1," "2," "3," "4," "5," and "6" tubes are supplied with a positive potential of 67.5 volts from terminal 495 over conductor 496, to which they are directly connected.

The screen grids of the "7," "8," "9," "10," "11," and "12" tubes are also supplied with a positive potential of 67.5 volts. The circuit for these tubes is different from the one given above and starts from terminal 497 (Fig. 4), which is at a positive potential of 67.5 volts, and continues over point 498, conductor 499, normally closed contacts 500 of reset relay 501, point 502, terminal 503, which is connected to terminal 504 (Fig. 5), to which the screen grids are connected over conductor 505. When contacts 500 are opened by the relay 501, the potential is removed from the screen grids of these tubes, causing them to be rendered non-conducting, which, through the trigger connections between the tubes, causes the "1," "2," "3," "4," "5," and "6" tubes to become conducting to place the ring in its zero or starting position.

The suppressor grids and cathodes of the tubes are connected directly to ground. The cathodes of the tubes are directly heated and have cathode heating potential of 1.4 volts applied thereto from conductor 412 (Fig. 4), to which this potential is applied when the receiving apparatus is placed in operative condition, the connection being from conductor 412 over terminal 413, which is connected to terminal 511 (Fig. 5), to which the cathodes are connected over conductor 512.

The control grids of the tubes are connected to a negative biasing potential source, to an operating impulse conductor, and to the anodes of other tubes by trigger connections and by priming network connections.

The connections from the control grids of the several tubes to the negative potential source are similar and will be clear from the connection for the control grid 514 of the "1" tube, which is connected over point 515 and resistor 516 of 1 megohm to point 517 on the negative potential supply conductor 518 extending from terminal 519, which is supplied with a negative potential of 135 volts. These connections supply the control grids with negative biasing potential.

The connections from the control grids of the several tubes to the operating impulse conductor 520 for the ring are also similar and will also be clear from the connection for the control grid 514 of the "1" tube. Grid 514 is electrostatically coupled, over point 515 and capacitor 521 of 10 micro-microfarads, to point 522 on the operating impulse conductor 520. The operating impulse conductor 520 for the ring is connected to terminal 523, which is connected to terminal 524 (Fig. 4), which is supplied with an amplified and shaped negative impulse from tube 441, over points 461 and 471, capacitor 525 of 1,250 micro-microfarads, point 526, and conductor 527, each time an impulse of a burst is received. These connections of the control grids to the operating impulse conductor 520 enable each of the impulses of a burst to be impressed on all the tubes of the ring and cause the pairs to operate and change their mode of operation selectively one after another to provide a representation of a control number corresponding to the number of impulses in the burst.

As mentioned earlier herein, the tubes of the ring are connected to form trigger pairs. In each trigger pair, the control grid of each tube of the pair is connected to the anode of the other tube of the pair, so that, at any instant when the receiving apparatus is in operative condition, one of the tubes is conducting and the other is non-conducting. The connections by which the "1" and "7" tubes are operatively coupled to form a trigger pair are representative of the connections between the tubes of the several pairs and are as follows—from control grid 514 of the "1" tube, one portion of the trigger connection extends over point 515, conductor 530, points 531 and 532, resistor 533 of 870,000 ohms, and capacitor 534 of 25 micro-microfarads in parallel, and thence over point 535, conductor 536, and point 537, to which the anode 538 of the "7" tube is connected. The other portion of the trigger connection between these tubes extends from control grid 539 of the "7" tube over a resistor 540 of 870,000 ohms and capacitor 541 of 25 micro-microfarads in parallel to the anode 490 of the "1" tube. These connections between the anodes and control grids of the "1" and "7" tubes enable the potential variations of the anodes, as the tubes become conducting and non-conducting, to be impressed on the control grids to control the operation of the tubes as a trigger pair in which one or the other of the tubes, but not both of the tubes, of the pair will be conducting at the same time. Similar connections connect the "2" and "8," the "3" and "9," the "4" and "10," the "5" and "11," and the "6" and "12" tubes to form trigger pairs.

The control grids are also provided with priming connections which extend from the control grids of the tubes of a trigger pair over suitable resistors to the anodes of the tubes of another trigger pair. The priming connection for the control grid 514 of the "1" tube extends from point 532, over resistor 542 of 2.5 megohms, and conductor 543 to point 544, to which the anode 545 of the "6" tube is connected. Similar priming conditions extend between anode 490 of the "1" tube and the control grid 546 of the "8" tube; between the anode 538 of the "7" tube and the control grid 547 of the "2" tube; between the anode 548 of the "2" tube and the control grid 549 of the "9" tube; between the anode 550 of the "8" tube; and the control grid 551 of the "3" tube; between the anode 552 of the "3" tube and the control grid 553 of the "10" tube; between the anode 554 of the "9" tube and the control grid 555 of the "4" tube; between the anode 556 of the "4" tube and the control grid 557 of the "11" tube; between the anode 558 of the "10" tube and the control grid 559 of the "5" tube; between the anode 560 of the "5" tube and the control grid 561 of the "12" tube; between the anode 562 of the "11" tube and the control grid 563 of the "6" tube; and between the anode 564 of the "12" tube and the control grid 539 of the "7" tube.

In order to cause the trigger pairs of the ring to be operated in step-by-step manner and to prevent all the trigger pairs from responding to each impulse, the control grids of the tubes of the trigger pairs are given potentials which will prevent the trigger pairs from responding to the impulses. These potentials, however, can be modified to prime a pair so that it will respond to an impulse and change its mode of operation.

The trigger connections and priming connections are so arranged that, when any six consecutive tubes of the ring are conducting, only one of these conducting tubes will have its control grid connected to the anode of another conducting tube, and only the non-conducting tube paired with said one conducting tube will have its control grid connected to the anode of another non-conducting tube. Said one conducting tube and the non-conducting tube paired therewith will have the potentials of their control grids modified by the connections to the anodes of other tubes, so that the potential of the control grid of the conducting tube will be less positive than that of the other conducting tubes, and the potential of the control grid of the non-conducting tube will be less negative than that of the other non-conducing tubes, and this pair of tubes can respond to an impulse impressed on the ring and change its mode of operation. As this pair changes its mode of operation, it will cause another pair to be primed to respond to the next impulse impressed on the ring.

Referring to Fig. 5, which shows the ring in starting condition with tubes "1" through "6," shown shaded, in conducting condition, the "1"

tube has its control grid 514 connected to the anode 545 of the "6" tube, and the "7" tube has its control grid 539 connected to the anode 564 of the "12" tube, and this pair is primed. When the first negative potential operating impulse is impressed on conductor 520, the "1" tube will be rendered non-conducting and will be effective through the trigger connections to render the "7" tube conducting. After the "1" and "7" tubes have changed their mode of operation, the "2," "3," "4," "5," "6," and "7" tubes will be conducting and the "2" and "8" tubes will be primed to be operated by the next impulse impressed on conductor 520.

This operation of successively priming the trigger pairs as other trigger pairs change their mode of operation enables the trigger pairs of the ring to change their mode of operation one after another in endless step-by-step sequence in response to impressed impulses. After a burst containing any number of impulses has been impressed on the ring, the group of tubes which is conducting will represent the control number corresponding to the number of impulses in the burst. The conducting and non-conducting condition of the tubes which enables the ring to provide a representation of a control number is also used to control the presettable means in a manner to be described hereinafter.

*Resetting means*

To enable the differentially operable means to be operated twice to count the number of impulses in each of the two bursts, resetting means are provided to restore the differentially operable means to its zero or starting condition after the differentially operable means has been operated by the first burst and has controlled the presettable means according to the first control number, but before the second control number is received.

The resetting means includes two pairs of 1S5 type tubes, one pair of which includes tubes 570 and 571, which cause the energization of the reset relay 501 to open contacts 500 and remove screen grid potential from the "7", "8," "9," "10," "11," and "12" tubes to render these tubes non-conducting and thus restore the ring to its starting condition; and the other pair of which includes tubes 572 and 573, which are operated by the received impulses and cause the operation of the first pair to occur at the proper time after the pair is no longer affected by impulses.

Tubes 572 and 573 are connected to form an unbalanced trigger pair in which tube 572 is normally conducting when the receiving apparatus is in operative condition and tube 573 is normally non-conducting.

Anode 574 of tube 572 is supplied with a potential of about 125 volts from point 485 on conductor 484, over resistor 575 of 50,000 ohms and point 576.

Screen grid 577 is supplied with a potential of 67.5 volts from terminal 497, over point 498 and conductor 578.

Suppressor grid 579 and cathode 580 are connected directly to ground, and the cathode is supplied with heating potential of 1.4 volts from conductor 412 when the receiving apparatus is in operative condition.

Control grid 581 is connected to ground over points 582 and 583 and resistor 584 of 2.5 megohms. Point 582 is connected over capacitor 585 of 10 micro-microfarads to point 526 in the output circuit from the amplifying and shaping means to enable the impulses which are received to be impressed on the tube 572. Point 583 is connected over resistor 586 of 100,000 ohms and capacitor 587 of 1,000 micro-microfarads to point 588 in the anode potential supply circuit for tube 573 to enable the potential of the anode 589 of tube 573 to control conduction in tube 572.

Anode 589 of tube 573 is supplied with a positive potential of about 125 volts from point 483 over resistor 590 of 50,000 ohms and point 588.

Screen grid 595 is supplied with a positive potential of 67.5 volts from conductor 578.

Suppressor grid 596 and cathode 597 are directly connected to ground, and the cathode is also supplied with heating potential of 1.4 volts from conductor 412.

Control grid 598 is given a negative bias to cut-off conduction in the tube by being connected over points 599 and 600 and resistor 601 of 200,000 ohms to point 602 on conductor 603, which is connected to terminal 604 having a negative potential of 45 volts.

Point 599 is connected over point 605, resistor 606 or 500,000 ohms, and capacitor 607 of 25 micro-microfarads in parallel, points 608 and 609, and conductor 610 to point 576 in the circuit to the anode 574 of tube 572 to enable the potential of the anode 589 of tube 573 to control conduction in tube 572.

When the negative potential impulse is impressed on control grid 581, over capacitor 585 from point 526, it will cause tube 572 to become non-conducting and cause the potential of anode 574 to become more positive. The change in the potential of anode 574 will be effective to reduce the bias of control grid 598 of tube 573, which renders this tube conducting. Conduction in tube 573 will cause the potential of anode 589 to drop, and this drop is impressed, as a negative potential, through the large capacitor 587, on the control grid 581 of tube 572. The circuit from the anode 589 through capacitor 587 to the control grid 581 will maintain tube 572 cut off as long as impulses of the burst are impressed on the grid 572. When impulses are no longer impressed on grid 581, the charge on capacitor 587 will be dissipated after a predetermined time and the grid can return to its normal potential and allow tube 572 to become conducting. Conduction in tube 572 will cause the control grid 598 of tube 573 to be restored to its negative potential to cause conduction to cease in tube 573.

When tube 572 becomes conductive after the charge on capacitor 578 has been dissipated, the potential of its anode will drop and provide a negative potential impulse to cause an operation of the reset pair of tubes to cause the ring to be restored to starting condition in order that the impulses of another burst may be counted.

In the reset pair, tube 570 is normally conducting when the receiving apparatus is in operating condition and, due to the trigger connections, tube 571 is non-conducting. Whenever tube 570 is rendered non-conducting, it will be effective, through the trigger connection, to render tube 571 conducting to cause the ring to be reset.

When the receiving apparatus is in operative condition, anode 615 of tube 570 has a positive potential of about 125 volts applied thereto from point 482, over point 616, resistor 617 of 50,000 ohms, and point 618.

Screen grid 619 is given a positive potential of 67.5 volts from point 498.

Suppressor grid 620 and cathode 621 are directly connected to ground, and the cathode is supplied with heating potential of 1.4 volts from conductor 412.

Control grid 622 is given a potential which allows tube 570 to be conducting when the receiving apparatus is fully in operating condition. Grid 622 is connected over point 623 and resistor 624 of 200,000 ohms to point 625 in a delay network and is connected over points 623 and 626, resistor 627 of 500,000 ohms and capacitor 628 of 25 micro-microfarads in parallel, and over point 629 and conductor 630 to point 631 in the potential supply circuit for anode 632 of tube 571 to enable the conducting and non-conducting condition of tube 571 to affect the conduction in tube 570. Point 626 is coupled over capacitor 635 of 10 micro-microfarads and conductor 636 to point 609, to which anode 574 of tube 572 is connected, and enables the drop in the potential of anode 574, when tube 572 becomes conducting, to be used to cause an operation of the reset pair.

Anode 632 of tube 571 is given a positive potential of about 125 volts, when the receiving apparatus is in conducting condition, by a circuit from point 616 over conductor 637, winding of reset relay 501, conductor 638, point 639, resistor 640 of 50,000 ohms, and point 631. Point 639 is by-passed to ground over a stabilizing capacitor of .02 microfarad.

Screen grid 641 is given a positive potential of 67.5 volts from point 502 in the circuit which extends over contacts 500, which potential will be removed from the screen grid each time contacts 500 are opened in a resetting operation.

Suppressor grid 642 and cathode 643 are directly connected to ground, and the cathode is supplied with heating potential of 1.4 volts from conductor 412.

Control grid 644 is normally at a potential which biases tube 571 to cut-off. Grid 644 is connected over point 645 and resistor 650 of 200,000 ohms to conductor 603, which extends to terminal 604, which is at a negative potential of 45 volts. Point 645 is also connected over point 646, resistor 647 of 500,000 ohms, and capacitor 648 of 25 micro-microfarads in parallel and point 649 to point 618 in the circuit to the anode 615 of tube 570.

When tube 571 is non-conducting, there will be no current in its anode circuit and relay 501 will not be energized; however, when tube 571 is rendered conducting by tube 570, the current in the anode circuit will cause relay 501 to be energized to open contacts 500 and remove the screen grid potential from the "7," "8," "9," "10," "11," and "12" tubes of the ring to place the ring in its starting condition.

Contacts 500 also remove the potential from screen grid 641 of tube 571, which causes this tube to become non-conducting and, through the trigger circuits, causes tube 570 to become conducting again.

Control grid 622 of tube 570 is further controlled from the delay circuit to which it is connected, so that, when the receiving apparatus is changed from standby condition to operative condition, tube 570 will not become conducting immediately but will become conducting after a suitable delay. While the receiving apparatus is in standby condition, control grid 622 is given a negative potential of 135 volts by a circuit which starts at terminal 652, which is at this potential, and continues over conductor 653 and resistor 654 of 650,000 ohms to point 625. This will cause the grid 622 to be given a negative potential of 135 volts, which will bias the tube considerably past cut-off.

As soon as relay 408 operates in response to the special control signal and applies a positive potential of 135 volts to conductor 427, this potential is applied from conductor 427 to point 625 over resistor 655 of 10 megohms and tends to render the potential of point 625 less negative. Point 625 is coupled to ground over a suitable capacitor, which delays the effect of the applied positive potential on the point 625. The length of delay can be regulated by the size of the capacitor and resistor 655 to insure that the tubes are in operative condition before tube 570 is rendered conducting.

During this delay period, tube 570 will not be conducting and, through trigger connections, will cause control grid 644 to be of a potential which will allow tube 571 to conduct. As soon as tube 571 is properly heated and is in operative condition, it will begin to conduct and will energize relay 501, which removes potential from the screen grid 641, to cause tube 571 to become non-conducting and allow relay 501 to be deenergized and reapply potential to the screen grid to render the tube conducting again. Tube 571, therefore, will conduct periodically while tube 570 is held against conduction and will cause relay 501 to open contacts 500 periodically to insure that the various trigger pairs of the ring will be placed in starting condition as soon as the tubes of the pairs become completely operative. When point 625 has reached its normal operating potential, which allows tube 570 to become conducting, this tube will be rendered conducting by the next non-conducting condition of tube 571, and the pair will be stabilized with tube 570 conducting the tube 571 non-conducting.

The resetting means, therefore, sets the differentially operable means in starting condition when the receiving apparatus is rendered operative, and also resets the differentially operable means to starting condition at a suitable time after each operation thereof, which enables the differentially operable means to be set differentially according to the impulses of the two bursts.

*Presettable means*

In order that the receiving apparatus can cause the required control to take place, or, as in the instant embodiment, indicate when any two selected control numbers have been received, presettable means are provided to be controlled by the differentially operable means according to the differential operation thereof and to provide an indication if the selected control members have been received.

It will be recalled that at any stage of operation of the differentially operable means, six tubes will be conducting and six tubes will be non-conducting and that, as shown in the chart given earlier herein, the beginning and ending tubes of the group of conducting or non-conducting tubes will be different at each stage of the operation. It will also be recalled that the potential of the anodes of the conducting tubes is less positive than the potential of the anodes of the non-conducting tubes and that the potential of the control grids of the conducting tubes is more positive than the potential of the control grids of the non-conducting tubes. Any of these conditions may be used to enable the differentially operable means to control the presettable means.

In the instant embodiment, the presettable means is arranged to operate if the potential of the control grids of the two tubes that will be conducting only when the desired control number is received is that of conducting tubes.

Since the control apparatus is arranged for control by any two selected control numbers, the presettable means will consist of two parts.

The first part of the presettable means (Fig. 6) includes a vacuum tube 660 of the 1R5 type and a relay 661 operated by the tube whenever the tube is rendered conducting by the differentially operable means when the differentially operable means has been set according to the first selected control number. Tube 660 is rendered operable when the receiving apparatus is placed in operative condition and will operate if the proper control number is received.

Anode 662 of tube 660 is given a positive potential of about 125 volts when the receiving apparatus is in operative condition, the circuit extending over conductor 663, point 664, resistor 665 of 25,000 ohms, winding of relay 661, point 666, conductor 667, point 668, and terminal 669, which is connected to terminal 487 (Fig. 4).

Screen grid 670 is given a positive potential of 67.5 volts from terminal 671 over conductor 672, point 673, conductor 674, and point 675.

Suppressor grid 679 and cathode 680 are connected directly to ground, and the cathode is supplied with heating potential of 1.4 volts from conductor 412 (Fig. 4) over terminal 413, terminal 414 (Fig. 6), point 415, and conductor 681.

Control grids 682 and 683 are supplied with potential from the control grids of the tubes of the ring which will be conducting when the control number for which this part of the presettable means is set has been received. In the example given earlier herein, the receiving apparatus is preset to respond if control numbers "9" and "2" are received in that order; therefore, control grids 682 and 683 are respectively connected to control grids 553 and 551 of the "10" and the "3" tubes of the ring, which tubes will be conducting at the same time only after the ring has been operated by nine impulses to represent the control number "9."

The connection from control grid 682 to the control grid of the "10" tube extends over resistor 684 of 2.2 megohms, terminal 685, which is connected to terminal 686 (Fig. 5), to which the control grid 553 of the "10" tube is connected by the connector 687.

The connection from control grid 683 to the control grid of the "3" tube extends over resistor 688 of 2.2 megohms, terminal 689, which is connected to terminal 690 (Fig. 5), to which the control grid 551 of the "3" tube is connected by connector 691.

When either the "3" tube or the "10" tube is non-conducting, its control grid will be at a negative potential and the control grid of tube 660, which is connected thereto, will be given a negative potential which will prevent conduction from occurring in tube 660. However, when both the "3" tube and the "10" tube are conducting at the same time, both control grids of tube 660 will be at a positive potential and tube 660 will be conductive.

Conduction in tube 660 will cause relay 661 to be energized to close contacts 695, 696, and 697. Contacts 695 will close a holding circuit for relay 661 from point 664 over closed contacts 695, conductor 698, point 699, and to ground over a release key, which circuit also shunts out tube 660 to prevent its further operation as long as relay 661 remains energized. Contacts 696 render the second part of the presettable means operable by supplying the screen grid 700 of tube 701, which is included in the second part, with a positive potential of 67.5 volts. Contacts 697 complete a circuit which starts from terminal 702, upon which is impressed a positive potential of 3 volts, and continues over conductor 703, contacts 697, conductor 704, and the filament of signal lamp 705 to ground.

When the first of the preselected control numbers is received, therefore, it will cause the second part of the presettable means to be rendered operable, will render tube 660 inoperable, and will cause the signal lamp 705 to be lighted.

The second part of the presettable means is similar to the first part but is inoperative until the first of the selected control numbers has been received.

Anode 710 of tube 701 is also given a positive potential of about 125 volts from point 668 over the winding of relay 711, resistor 712 of 25,000 ohms, point 713, and conductor 714.

Screen grid 700 is given a positive potential of 67.5 volts from terminal 671, over conductor 672, point 673, contacts 696, conductor 715, resistor 716, of 1,000 ohms, point 717, and conductor 718. Point 717 is by-passed to ground over a stabilizing capacitor of .1 microfarad.

Suppressor grid 719 and cathode 720 are connected directly to ground, and the cathode is supplied with heating potential from conductor 681.

Control grids 723 and 724 are supplied with their potential from the control grids of the "8" and "3" tubes, which will be conducting at the same time only when "2" or the second selected control number has been received. The connections from control grids 723 and 724 are similar to those for the control grids of the first part, extending, respectively, over resistors 725 and 726 of 2.2 megohms, terminals 727 and 728, which are connected to terminals 729 and 730 (Fig. 5), to which control grids 546 and 551 of the "8" and "3" tubes are connected by connectors 731 and 732.

When the second part of the presetting means has been rendered operative by the first part and the ring is operated so that the "3" and "8" tubes are both conducting, then the tube 701 will become conductive and energize relay 711, which closes contacts 735 and 736.

Contacts 735 will close a holding circuit for relay 711 from point 713 over contacts 735 to point 699, which circuit also shunts out tube 701. Contacts 736 complete a circuit from conductor 703, over contacts 736, conductor 737, and filament of signal lamp 738 to ground to cause the lamp to be lighted to indicate that both of the selected control numbers have been received.

It is obvious that, instead of causing the lamp 738 to be lighted, contacts 736 could close a motor circuit or some control circuit for controlling the operation of some other mechanism.

If either or both of the control numbers which are received are not the ones for which the apparatus is preset, then the signal lamp will not be operated to provide an indication.

The changing of the presetting of the parts of the presettable means can be made very readily merely by changing the connection of the connectors 687, 691, 731, and 732 to the control grids of tubes in the ring which correspond to the new control numbers.

After a period of time in which both control numbers could have been received, the receiving apparatus is restored to standby condition by the operation of the timing means.

*Timing means*

The timing means which restores the receiving apparatus to standby condition is shown in Fig. 6 and includes tube 740, which controls the energization of restoring relay 418.

Anode 741 of tube 740 is given a positive potential of about 125 volts whenever the receiving apparatus is in operative condition by a circuit which extends over conductor 742, and the winding of restoring relay 418, to conductor 667.

Screen grid 743 is supplied with positive potential of 67.5 volts from point 675.

Suppressor grid 744 and cathode 745 are directly connected to ground, and the cathode is supplied with heating potential of 1.4 volts from conductor 412 (Fig. 4) over terminal 413 (Fig. 4), terminal 414 (Fig. 6), point 415, and conductor 681.

Control grid 746 is supplied with a negative potential of 135 volts from terminal 652 (Fig. 4) over conductor 653, resistor 747 of 10 megohms, point 748, and terminal 749, which is connected to terminal 750 (Fig. 6), to which the control grid 746 is connected over point 751. Point 751 is connected to ground over a capacitor 752 of 4 microfarads.

When the receiving apparatus is changed to an operative condition from a standby condition, a positive potential is applied to point 748 from conductor 427 over a resistor 753 of 10 megohms. This positive potential will tend to overcome the negative bias on grid 746 and render tube 740 conducting, but the capacitor 752 will delay the effect of this applied positive potential to allow sufficient time for the receiving apparatus to receive the two control numbers in the normal course of operation and to exert the required control if preset according to these control numbers, before the bias on grid 746 is reduced sufficiently to allow tube 740 to become conducting. The interval of time between the application of positive potential and the act of conduction occurring in tube 740 can be controlled by varying the capacitance of capacitor 752.

Upon conduction occurring in tube 740, restoring relay 418 will be energized and open contacts 417 in the holding circuit for relay 408 (Fig. 4) and will cause relay 408 to be released to restore the various parts of the receiving apparatus to standby condition.

It is believed that the operation of the novel control apparatus has been made clear from the foregoing description and that a further explanation of the operation is not necessary.

While the form of the invention herein shown and described is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a remote control system, two stations; means at one station for generating a related plurality of bursts of impulses, each burst containing a selected number of impulses; means for transmitting the bursts of impulses from said one station to the other station; means at the other station for counting the number of impulses in each burst; a plurality of presettable means at said other station, one presettable means being provided for each of the related bursts and each of the presettable means, other than the one related to a particular burst, being normally inoperative; means selectively connecting each of the presettable means to the counting means according to a preselected control number, for operation by the counting means if the burst related to the presettable means contains a number of impulses which represent the control number for which it is set; means connecting the presettable means so that the operation of the presettable means related to one burst can prepare the presettable means related to the next burst for operation by the counting means, whereby the presettable means will operate one after another in sequence if their related bursts contain the proper predetermined numbers of impulses but their sequential operation will be interrupted as soon as any burst does not contain the proper number of impulses; and control means operated by the last presettable means of the sequence for providing a desired control when the related plurality of bursts contain the proper numbers of impulses.

2. In a control system, a sending station and a receiving station; said sending station including means to generate spaced bursts of impulses, each burst containing an individually selected number of discrete rapidly recurring impulses, and radio transmitting means for transmitting the bursts of impulses to the receiving station; and said receiving station including radio receiving means to receive the bursts of impulses, counting means comprising a plurality of electron tubes interconnected in a chain for sequential operation to be controlled by the receiving means to count the impulses in each burst, and control means selectively preset according to any desired preselected control numbers represented by the bursts, for control by the counting means to be operated thereby and exert a desired control if the number of impulses in each of the several bursts represent the preselected numbers for which the control means has been preset.

3. In a remote control system, two stations; means at one station for generating a related plurality of spaced bursts of impulses, each burst containing a selected number of impulses; means for transmitting the bursts of impulses one after another from said one station to the other station; means at the other station for counting the number of impulses in each burst; a plurality of presettable means at said other station, one presettable means being provided for each of the related bursts and each of the presettable means, other than the one related to the first burst, being normally inoperative; means selectively connecting each of the presettable means to the counting means according to a preselected control number, for operation by the counting means if the burst related to the presettable means contains a number of impulses which represent the control number for which it is set; and means connecting the presettable means so that the operation of the presettable means related to one burst can prepare the presettable means related to the next burst for operation by the counting means, whereby the presettable means will operate one after another in sequence if their related bursts contain the proper predetermined numbers of impulses but the sequential operation will be interrupted as soon as any burst does not contain the proper number of impulses.

4. In a remote control system, two stations; means at one station for generating a related plurality of spaced bursts of impulses, each burst containing a selected number of impulses; means for transmitting the bursts of impulses one after another from said one station to the other station; means at the other station for counting the number of impulses in each burst; a plurality of presettable means at said other station, one presettable means being provided for each of the related bursts and each of the presettable means other than the one related to the first burst being normally inoperative; means selectively connecting each of the presettable means to the counting means according to a preselected control number for operation by the counting means if the burst related to that presettable means contain a number of impulses which represent the control number for which it is set; means connecting the presettable means so that the operation of the presettable means related to one burst can prepare the presettable means related to the next burst for operation by the counting means, whereby the presettable means will operate one after another in sequence if their related bursts contain the proper predetermined numbers of impulses but the sequential operation will be interrupted if any burst does not contain the proper number of impulses; and control means operable by the last of the presettable means in the sequence to cause the desired operation of some other means when the last presettable means operates and indicates that the several bursts of impulses contained the proper number of impulses as required by the preselected control numbers.

5. In a control system, a sending station and a receiving station; said sending station including means to generate spaced bursts of impulses, each burst containing an individually selected number of discrete rapidly recurring impulses, radio transmitting means which is normally biased to cut-off, and means controlled by the impulse generating means to modify the bias and allow the bursts of impulses to be transmitted to the receiving station; and said receiving station including radio receiving means to receive the bursts of impulses, counting means comprising a plurality of electron tubes interconnected in a chain for sequential operation to count the number of impulses in each burst, and control means selectively preset according to any desired preselected control numbers represented by the bursts for control by the counting means to be operated thereby and exert a desired control if the number of impulses in each of the several bursts represent the preselected numbers for which the control means has been preset.

6. In a control system, a sending station and a receiving station; said sending station including electron tube means differentially controlled to generate spaced bursts of impulses containing selected numbers of discrete rapidly recurring impulses, and radio transmitting means having an output stage which is normally biased to cut-off, which bias is modified by the impulse generating means to allow the bursts of impulses to be transmitted to the receiving station, the transmitting means being on the air only for the short time actually required to form the impulses; and said receiving station including radio receiving means to receive the bursts of impulses, electron tube counting means to count the number of impulses in each burst, and control means selectively connected to tubes of the counting means according to preselected control numbers for control by the tubes of the counting means to be operated thereby and exert a desired control if the number of impulses in each of the several bursts represent the preselected numbers for which the control means has been preset.

7. In a remote control system, a sending station and a receiving station, said sending station including means to generate a special control signal of sufficient duration to cause a relay to be operated, and radio transmitting means controlled by the signal generating means to transmit the special control signal to the receiving station; and said receiving station being normally in a standby condition and including radio receiving means to receive the special control signal, a relay operated by the special control signal for changing the receiving station from standby condition to operative condition for further control from the sending station, and timing means set into operation by said relay for restoring the receiving station to standby condition at a predetermined time after the operation of the relay.

8. In a remote control system, a sending station and a receiving station, said sending station including means to generate a special control signal of sufficient duration to cause a relay to be operated, and radio transmitting means controlled by the signal generating means to transmit the special control signal to the receiving station; and said receiving station being normally in a standby condition and including radio receiving means to receive the special control signal, a relay operated by the special control signal for changing the receiving station from standby condition to operative condition for further control from the sending station, a holding circuit for maintaining the relay in operated condition, and means set into operation by said relay for interrupting the holding circuit for the relay and restoring the receiving station to standby condition at a predetermined time after the operation of the relay.

9. In a remote control system, a sending station and a portable battery-operated receiving station; said sending station including means to generate spaced bursts of impulses, each burst containing an individually selected number of discrete rapidly recurring impulses, and radio transmitting means controlled by the impulse-generating means to transmit the bursts of impulses to the receiving station; and said receiving station including a battery-operated radio receiving means to receive the bursts of impulses, a battery-operated electron tube counting means comprising a plurality of electron tubes interconnected in a chain for sequential operation to be operated by the received impulses to count the number of impulses in each burst, and control means selectively presettable according to preselected control numbers for control by the counting means to be operated thereby to exert the desired control if the number of impulses in the bursts represent the preselected numbers for which the control means has been preset.

10. In a remote control system, a sending station and a portable battery-operated receiving station; said sending station including electron tube means operable to generate impulses at about 20,000 impulses per second to provide spaced bursts of impulses containing selected numbers of impulses, and radio transmitting means controlled by the impulse-generating means to transmit the bursts of impulses to the receiving station; and said receiving station including a battery-operated radio receiving means to receive the bursts of impulses, a battery-operated electron tube counting means comprising a plurality of electron tubes interconnected in a chain for sequential operation to be operated by the received impulses to count the number of impulses in each burst, and control means selectively presettable according to preselected control numbers for control by the counting means to be operated thereby to exert the desired control if the number of impulses in the bursts represent the preselected numbers for which the control means has been preset.

11. In a remote control system, a sending station and a portable battery-operated receiving station; said sending station including means to generate a special control signal, means to generate spaced bursts of impulses containing selected numbers of discrete rapidly recurring impulses, and radio transmitting means controlled by the special control signal generating means and impulse-generating means to transmit the special control signal and the bursts of impulses to the receiving station; and said receiving station being normally in standby condition and including a battery-operated radio receiving means to receive the special control signal and bursts of impulses, means operated by the special control signal to change the receiving station from a standby condition to an operative condition, a battery-operated electron tube counting means operated by the received impulses to count the impulses in each burst, control means selectively presettable according to preselected control numbers for control by the counting means to be operated thereby to exert the desired control if the number of impulses in the bursts represent the preselected numbers for which the control means has been preset, and timing means set in operation by the special control signal for restoring the receiving station to standby condition at a predetermined time after it was placed in operative condition.

12. In a remote control system, two stations; means at one station for generating two bursts of impulses with a space between bursts, and each burst containing any desired number of impulses; means for transmitting the bursts of impulses from said one station to the other station; means at the other station for counting the number of impulses in each burst; a first means preset to be operated by the counting means if one of said bursts of impulses contains a predetermined number of impulses; a second means preset to be operated by the counting means if the other of said bursts of impulses contains a predetermined number of impulses, said second means being normally inoperable by the counting means; and means operated by said first means, when it operates, for preparing said second means for operation by the counting means, whereby the operation of said second means can occur only if the first means has operated and if said other burst of impulses contains the number of impulses for which the second means was preset to be operated by the counting means.

13. In a remote control system, two stations; means at one station for generating two bursts of impulses with a space between bursts, and each burst containing any desired number of impulses; means for transmitting the bursts of impulses one after another from said one station to the other station; means at the other station for counting the number of impulses in each burst; a first means preset according to a preselected control number to be operated by the counting means if the first burst of impulses contains a predetermined number of impulses representing said preselected control number; a second means preset according to a second preselected control number to be operated by the counting means if the second burst of impulses contains a predetermined number of impulses representing said second preselected control number, said second means being normally inoperable to respond to the control of the counting means; means operated by said first means, when it operates, for preparing said second means for operation by the counting means, whereby the operation of said second means can occur only if the first means has operated and if the second burst of impulses contains the number of impulses for which the second means was preset to be operated by the counting means; and means operated by said second means, when it operates, to provide the desired control over the operation of some other means.

14. In a remote control system, two stations; differentially controlled electron tube means at one station for generating a related plurality of bursts of impulses, each burst containing a selected number of impulses; means for transmitting the bursts of impulses from said one station to the other station; electron tube means at the other station for counting the number of impulses in each burst; a plurality of vacuum tubes at said other station, one vacuum tube being provided for each of the related bursts and each of the vacuum tubes, other than the one related to a particular burst, being normally inoperative; means selectively connecting each of the vacuum tubes to the counting means according to a preselected control number, to be rendered conducting by the counting means if the burst related to the presettable means contains a number of impulses which represent the control number for which it is set; means connecting the vacuum tubes so that the conduction in the vacuum tube related to one burst can prepare the vacuum tube related to the next burst for operation by the counting means, whereby the vacuum tubes will become conducting one after another in sequence if their related bursts contain the proper predetermined numbers of impulses but the sequential operation will be interrupted as soon as any burst does not contain the proper number of impulses; and means operated by the last vacuum tube in the sequence for providing a desired control if the bursts contain impulses representing the desired control number.

15. In a control device to provide a desired control if certain predetermined numbers of impulses are included in each of a related plurality of bursts of impulses, the combination of a counting means for counting the impulses in the several bursts; means to impress the bursts of impulses on the counting means; a plurality of presettable means, one related to each of the bursts, selectively connected to the counting means to be operated by the counting means if said certain predetermined numbers of impulses are included in their related bursts of impulses, said presettable means, except the one related to a particular burst, being normally inoperable by the counting means; a plurality of means, one connected to each presettable means and operated thereby upon operation thereof, controlling the presettable means related to the various bursts for sequential operation, each of said plurality of means, except the one related to the last presettable means, if operated, preparing the next presettable means in the sequence for operation by the counting means, and the means connected to the last presettable means of the sequence, if operated, causing the desired control to take place, whereby, if any of the related plurality of bursts does not contain the proper number of impulses, the presettable means related to that burst will not operate, causing the sequential operation of the presettable means to be interrupted, and the means connected to the last presettable means of the sequence will not operate to cause the desired control to take place.

16. In a control device selectively operable to provide a desired control if certain predetermined numbers of impulses are included in various ones of a plurality of related bursts of impulses, the combination of a counting means including a plurality of devices operable step by step from a starting condition to count the impulses in a burst; means to restore the devices of the counting means to starting condition after the counting of each burst; a plurality of presettable means, one for each of said related bursts and each of the presettable means, other than the one related to the first burst to be counted, being normally inoperative; means selectively connecting the presettable means to the devices which represent the certain predetermined numbers of impulses to enable the counting means to operate each of the presettable means when the burst related to that presettable means contains the number of impulses for which the means was preset; means connecting the presettable means so that the operation of the presettable means related to one burst can prepare the presettable means related to the next burst to be counted, for operation by the counting means, whereby the presettable means will operate one after another in sequence if their related bursts contain the proper predetermined number of impulses; and control means operable by the last presettable means in the sequence to cause the desired control to be effected when the last presettable means operates and indicates that the several related bursts of impulses contained the proper number of impulses.

17. In a control device to provide a desired control if certain predetermined numbers of impulses are included in each of a related plurality of bursts of impulses, the combination of an electron-tube counting means for counting the impulses in the several bursts; means to impress the bursts of impulses on the counting means; means including a plurality of electron tubes, one related to each of the bursts, selectively connected to the tubes of the counting means to be rendered conducting by the counting means if said certain predetermined numbers of impulses are included in their related bursts of impulses, said tubes of the plurality of tubes, except the one related to a particular burst, being normally inoperable by the counting means; and a plurality of means, one connected to each of said plurality of tubes and operated thereby upon conduction occurring therein, for controlling the tubes of the plurality of tubes which are related to the various bursts for sequential operation, each of said plurality of means except the one connected to the last tube in the sequence, if operated, preparing the next tube in the sequence for operation by the counting means, and the means connected to the last tube of the sequence causing the desired control to take place.

18. In a control device to provide a desired control if certain predetermined numbers of impulses are included in each of a related plurality of spaced bursts of impulses, the combination of an electron tube counting ring operable to count impulses of a burst; resetting means to restore the ring to starting condition after a counting operation; reset control means operated by the impulses of a burst and operable to cause an operation of the resetting means to restore the ring to starting condition after counting the impulses of one burst but before the next burst is impressed thereon; means to impress spaced bursts of impulses on the counting ring and the reset control means to cause the ring to count the impulses of the bursts and to be reset automatically after said burst; means including a plurality of vacuum tubes, one related to each of the bursts, selectively connected to the tubes of the ring to be rendered conducting by the ring if the proper numbers of impulses are contained in their related bursts, said vacuum tubes except the one related to the first burst being normally inoperable by the ring; a plurality of means, one connected to each vacuum tube except the tube related to the last of the related bursts and operated thereby upon conduction occurring therein, each of said plurality of means, if operated, rendering the vacuum tube related to the next burst operable by the ring; and means connected to the vacuum tube related to the last of the related bursts and operable thereby upon conduction occurring therein, to cause the desired control to take place.

19. In a control device selectively operable if certain predetermined numbers of impulses are included in each of a pair of spaced bursts of impulses, the combination of an electron-tube counting ring operable to count impulses of a burst; resetting means to restore the ring to starting condition after a counting operation; reset control means operated by the impulses of a burst and operable to cause an operation of the resetting means during the interval between bursts; means to impress spaced bursts of impulses on the counting ring and the reset control means to cause the ring to count the impulses of the bursts and to be reset automatically between bursts; and means connected to the tubes of the ring according to said predetermined control numbers to be operated by the ring if the impulses in the bursts represent said predetermined numbers, including a first portion operated by the ring if the proper number of impulses is contained in the first burst, including a second portion prepared for operation by the operation of the first portion and operated by the ring if the proper number of impulses is contained in the second burst, and including control means operated by the second portion thereof to provide the desired control when the required predetermined numbers of impulses are included in the bursts.

20. In a device which can provide a desired control if certain predetermined numbers of impulses are included in each of a related plurality of bursts of impulses impressed thereon, the combination of a plurality of electron tubes, each tube having a plurality of electrodes; circuits interconnecting electrodes of different tubes in an operative pattern to connect the tubes in a ring for step-by-step operation in response to the impulses of a burst, the conducting and non-conducting condition of the tubes of the ring and the potential of their electrodes changing as each impulse is applied to the ring so that the conducting and non-conducting condition of the tubes and the potential of their electrodes can be utilized to provide an indication of the number of impulses in the burst which has operated the ring; means to control the ring to enable a separate count of the impulses in each burst to be obtained; a second plurality of electron tubes, one related to each of the bursts; circuits selectively connecting the tubes of the second plurality of tubes to similar electrodes of preselected tubes of the ring, which represent said certain predetermined numbers of impulses in the bursts, to enable the potential of these electrodes to cause the various tubes of the plurality of tubes to be rendered conducting if the bursts contain the required predetermined number of impulses, said tubes of the second plurality of tubes, except the one related to the first burst to be counted, being normally inoperable by the ring; and a plurality of means, one connected to each of said second plurality of tubes and operated thereby upon conduction occurring therein, each of said plurality of means except the one connected to the last tube of the sequence, when operated, preparing the tube in the sequence related to the next burst to be counted, for operation by the ring if the burst contains the required number of impulses, and the means connected to the last tube of the sequence, when operated, causing the desired control to take place.

21. In a device which can provide a desired control if certain predetermined numbers of impulses are included in each of a related plurality of bursts of impulses impressed thereon, the combination of a plurality of electron tubes, each tube having a plurality of electrodes; circuits interconnecting electrodes of different tubes in an operative pattern to connect the tubes in a ring for step-by-step operation in response to the impulses of a burst, the conducting and non-conducting condition of the tubes of the ring and the potential of their electrodes changing as each impulse is applied to the ring so that the conducting and non-conducting condition of the tubes and the potential of their electrodes can be utilized to provide an indication of the number of impulses in the burst which have operated the ring from starting condition; resetting means to restore the ring to starting condition after the impulses in each burst have been counted, to enable the ring to be used over to count the impulses in each burst; a second plurality of electron tubes, one related to each of the bursts; circuits selectively connecting the tubes of the second plurality of tubes to similar electrodes of preselected tubes of the ring, which represent said certain predetermined numbers of impulses in the burst, to enable the potential of these electrodes to control the conduction in the various tubes of the plurality of tubes and cause these tubes to be rendered conducting if the bursts contain the required predetermined number of impulses, said tubes of the second plurality of tubes, except the one related to the first burst to be counted, being normally inoperative by the ring; and a plurality of means, one connected to each of said second plurality of tubes and operated thereby upon conduction occurring therein, for controlling the tubes of the second plurality of tubes for sequential operation, each of said plurality of means except the one connected to the last tube of the sequence, when operated, preparing the tube in the sequence related to the next burst to be counted, for operation by the ring if the burst contains the required number of impulses, and the means connected to the last tube of the sequence, when operated, causing the desired control to take place.

22. In a portable radio-controlled battery-operated control device which can provide a desired control if certain predetermined numbers of impulses, individually preselected for each burst, are included in a related plurality of bursts transmitted thereto by radio, the combination of battery-operated radio receiving means to receive said impulses; a battery-operated electron tube counting means operated by the receiving means for counting the number of impulses in each burst; and control means connected to the tubes of the counting means, selectively according to any desired preselected control numbers, to be operated by the counting means to exert the desired control if the number of impulses in the several related bursts represent the preselected control numbers for which the control means has been preset.

23. In a portable battery-operated control device which is normally in standby condition in which it uses a minimum of power, the combination of a radio receiving means for receiving a special control signal and a plurality of bursts of impulses; electron tube means for counting the impulses of the bursts; means operated by the special control signal for changing the receiving means and the counting means from standby condition to operative condition to be operable by the bursts of impulses; and timing means set in operation by the special control signal and operable to restore the receiving means and the counting means to standby condition after a predetermined interval of time.

24. In a device of the class described, the combination of means differentially operable by impulses of a burst; resetting means for restoring the differentially operable means to starting condition after the differentially operable means has been operated by the impulses of a burst; control means operated by the impulses of a burst for causing the operation of the resetting means at a predetermined time after the last impulse has operated the control means; and means to impress a burst of impulses on the differentially operable means and the control means to cause the differential operation of the differentially operable means and the subsequent resetting thereof to starting condition.

25. In a device for counting the impulses in each of a plurality of spaced bursts of impulses, the combination of differentially operable means to count impulses of a burst; resetting means to restore the differentially operable means to starting condition after a counting operation; control means operated by the impulses of a burst and operable to cause an operation of the resetting means after a predetermined interval following the counting of the impulses of a burst; and means to impress spaced bursts of impulses on the differentially operable means and the control means to cause the differentially operable means to count the impulses of the bursts and to be reset automatically after each burst.

26. In a device of the class described, the combination of means differentially operable by impulses of a burst; resetting means for restoring the differentially operable means to starting condition after the differentially operable means has been operated by the impulses of a burst; control means including a trigger pair of tubes operated from normal condition by the impulses of a burst and remaining in operated condition until restored automatically to normal condition at a predetermined time after the last impulse of a burst; connections to enable the trigger pair of tubes to operate the resetting means when the trigger pair of tubes is restored to normal condition; and means to impress a burst of impulses on the differentially operable means and the control means to cause the differential operation of the differentially operable means and the subsequent resetting thereof to starting condition.

27. In a device for counting impulses of a burst, the combination of means differentially operable by impulses of a burst; resetting means for restoring the differentially operable means to starting condition after the differentially operable means has been operated by the impulses of a burst; control means including a pair of tubes connected as an unbalanced trigger pair and operated from normal condition by the impulses of a burst, and means in the trigger connections to retain the pair in operated condition until a predetermined time after the last impulse of a burst has been impressed thereon, after which the trigger pair can return to its normal condition; connections to enable the trigger pair of tubes to operate the resetting means when the trigger pair of tubes returns to normal condition; and means to impress a burst of impulses on the differentially operable means and the control means to cause the differential operation of the differentially operable means and the subsequent resetting thereof to starting condition.

28. In a device for counting impulses of a burst, the combination of a plurality of electron tubes; circuits connecting the tubes to form a ring in which the tubes are rendered conducting step by step in response to impulses so that, as different numbers of impulses operate the ring, different tubes of the ring will be conducting to indicate the number of impulses which have operated the ring from a zero or starting condition; resetting means to control conduction in the tubes of the ring to restore the ring to its zero or starting condition after the ring has been operated by the impulses of a burst; control means including a pair of tubes connected as an unbalanced trigger pair to be operated by impulses of a burst and having delay means in the trigger connections to delay the return of the trigger pair to normal condition after it has been operated by the impulses of a burst; connections to enable the trigger pair of tubes to operate the resetting means when the trigger pair of tubes returns to normal condition after the delay following the last impulse of the burst; and means to impress a burst of impulses on the tubes of the ring and on the control means to cause the operation of the tubes of the ring to count the number of impulses in the burst and cause the trigger pair to operate and subsequently operate the resetting means to restore the tubes of the ring to starting condition.

29. In a device for counting the impulses in each of a plurality of spaced bursts of impulses, the combination of an electron tube counting ring operable to count impulses of a burst; resetting means to restore the ring to starting condition after a counting operation; control means operated by the impulses of a burst and operable to cause an operation of the resetting means during the interval between bursts; and means to impress spaced bursts of impulses on the counting ring and the control means to cause the ring to count the impulses of the bursts and to be reset automatically between bursts.

30. In a device for automatically counting impulses in each of a plurality of bursts, the combination of a plurality of electron tubes; circuits connecting the tubes to form a ring in which the tubes are rendered conducting step by step in response to impulses so that, as different numbers of impulses operate the ring, different tubes of the ring will be conducting to indicate the number of impulses which have operated the ring from a zero or starting condition; resetting means to control conduction in the tubes of the ring to restore the ring to its zero or starting condition after the ring has been operated by the impulses of a burst to enable the ring to be operated repeatedly to count the impulses in each of a plurality of bursts; control means including a pair of tubes connected as unbalanced trigger pair to be operated by impulses of a burst and having delay means in the trigger connections to delay the return of the trigger pair to normal condition after it has been operated by the impulses of a burst; connections to enable the trigger pair of tubes to operate the resetting means when the trigger pair of tubes returns to normal condition after the delay following the last impulse of the burst; and means to impress a plurality of bursts of impulses on the tubes of the ring and on the control means to cause the differential operation of the tubes of the ring according to the number of impulses in a burst and cause the trigger pair to operate and subsequently operate the resetting means to restore the tubes of the ring to starting condition for further operation by the impulses of a succeeding burst.

31. In a device for counting impulses, the combination of an electron-tube counting ring which is normally in a standby condition but which can be placed in operative condition by the application of operating potentials thereto; resetting means to place the ring in starting condition so that the operation of the ring to count impulses will always begin at the same place in the ring; means to apply operating potential to the tubes of the ring to change the ring from standby condition to operative condition; and means to control the resetting means to cause the resetting means to operate when the ring is placed in operative condition, thereby to insure that the ring will be in starting condition when it is changed from standby condition to operative condition.

32. In a device for counting impulses, the combination of an electron-tube counting ring which is normally in a standby condition but which can be placed in operative condition by the application of operating potentials thereto; resetting means to control conduction in the tubes of the ring to place the ring in starting condition so that the operation of the ring to count impulses will always begin at the same place in the ring; means to apply operating potential to the tubes of the ring to change the ring from standby condition to operative condition; and means to cause the resetting means to operate during the time the tubes of the ring are becoming operative when the ring is placed in operative condition, thereby to insure that, as the tubes of the ring become operative, they will be controlled to cause the ring to be in starting condition when it is changed from standby condition to operative condition.

JOSEPH R. DESCH.
ERNEST V. GULDEN.

(References on following page)

REFERENCES CITED

The following references are of record in the file of this patent:

UNITED STATES PATENTS

| Number | Name | Date |
|---|---|---|
| 2,023,446 | Schroeter | Dec. 10, 1935 |
| 2,272,070 | Reeves | Feb. 3, 1942 |
| 2,340,798 | Deal | Feb. 1, 1944 |
| 2,373,134 | Massonneau | Apr. 10, 1945 |
| 2,401,618 | Crosby | June 4, 1946 |

FOREIGN PATENTS

| Number | Country | Date |
|---|---|---|
| 355,705 | Great Britain | Aug. 24, 1931 |